US011943042B2

(12) United States Patent
Robinson et al.

(10) Patent No.: US 11,943,042 B2
(45) Date of Patent: Mar. 26, 2024

(54) APPARATUSES AND METHODS FOR FACILITATING SATELLITE VISIBILITY FOR EARTH-BASED ANTENNA SYSTEMS

(71) Applicant: Space Exploration Technologies Corp., Hawthorne, CA (US)

(72) Inventors: Thomas Laurance Robinson, San Francisco, CA (US); Calder Christiansen Foster Coalson, Seattle, WA (US); Jared Michael Greene, Seattle, WA (US); Steven Douglas Gregory, Hermosa Beach, CA (US); Elliott Macdonald Schwartz, Fall City, WA (US); Aidan Bauer, Newton, MA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 85 days.

(21) Appl. No.: 17/499,421

(22) Filed: Oct. 12, 2021

(65) Prior Publication Data

US 2022/0116105 A1    Apr. 14, 2022

Related U.S. Application Data

(60) Provisional application No. 63/244,603, filed on Sep. 15, 2021, provisional application No. 63/179,110, (Continued)

(51) Int. Cl.
*H04B 7/185* (2006.01)

(52) U.S. Cl.
CPC ..... *H04B 7/18513* (2013.01); *H04B 7/18517* (2013.01); *H04B 7/18558* (2013.01)

(58) Field of Classification Search
CPC ........... H04B 7/18513; H04B 7/18517; H04B 7/18558
See application file for complete search history.

(56) References Cited

U.S. PATENT DOCUMENTS

| 6,111,542 | A | * | 8/2000 | Day | H01Q 21/06 |
| | | | | | 342/359 |
| 2004/0087294 | A1 | * | 5/2004 | Wang | H04B 7/084 |
| | | | | | 455/273 |

(Continued)

FOREIGN PATENT DOCUMENTS

| WO | WO-2006019290 | A1 | * | 2/2006 | ........... H01Q 1/1257 |
| WO | WO-2006113689 | A2 | * | 10/2006 | ............. G01S 19/28 |

*Primary Examiner* — Keith Ferguson
(74) *Attorney, Agent, or Firm* — Polsinelli PC

(57) ABSTRACT

In one embodiment of the present disclosure, a device for detecting a zone of communication between a user terminal and a satellite constellation including a plurality of satellites in non-geosynchronous (non-GEO) orbit includes one or more processors and memory. The memory stores instructions that, as a result of being executed by the one or more processors, cause the device to: determine a location of the device, wherein the location corresponds to a field of regard for detecting the zone of communication, and wherein the field of regard corresponds to an antenna aperture of the phased array antenna; evaluate a level of communication between the phased array antenna and the satellite constellation associated with the field of regard; and output, to a user of the device, an indication of the level of communication between the phased array antenna and the satellite constellation associated with the field of regard.

20 Claims, 26 Drawing Sheets

Related U.S. Application Data filed on Apr. 23, 2021, provisional application No. 63/091,254, filed on Oct. 13, 2020.

(56) References Cited

U.S. PATENT DOCUMENTS

2016/0290794 A1* 10/2016 Ni ..................... H04N 23/635
2017/0003395 A1*  1/2017 Sasaki ................. G01S 19/28
2017/0059715 A1*  3/2017 Wietfeldt ............. G01S 19/28

* cited by examiner

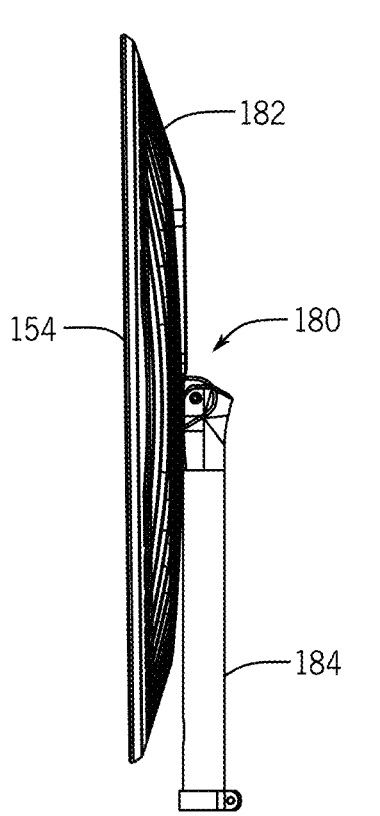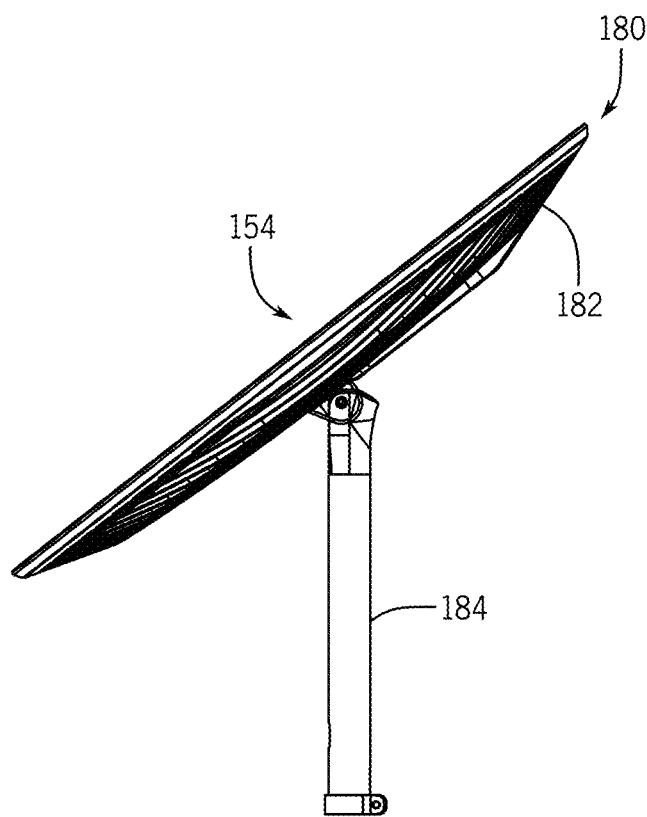
FIG. 7A
FIG. 7B
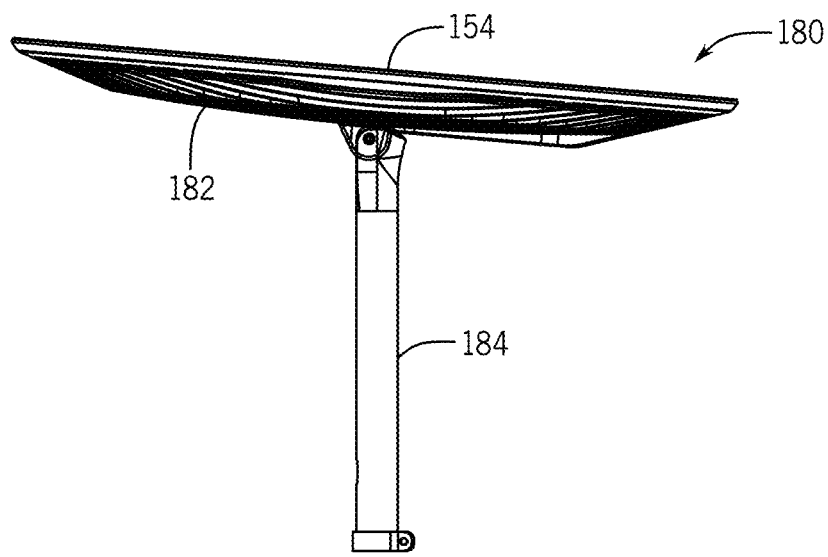
FIG. 7C

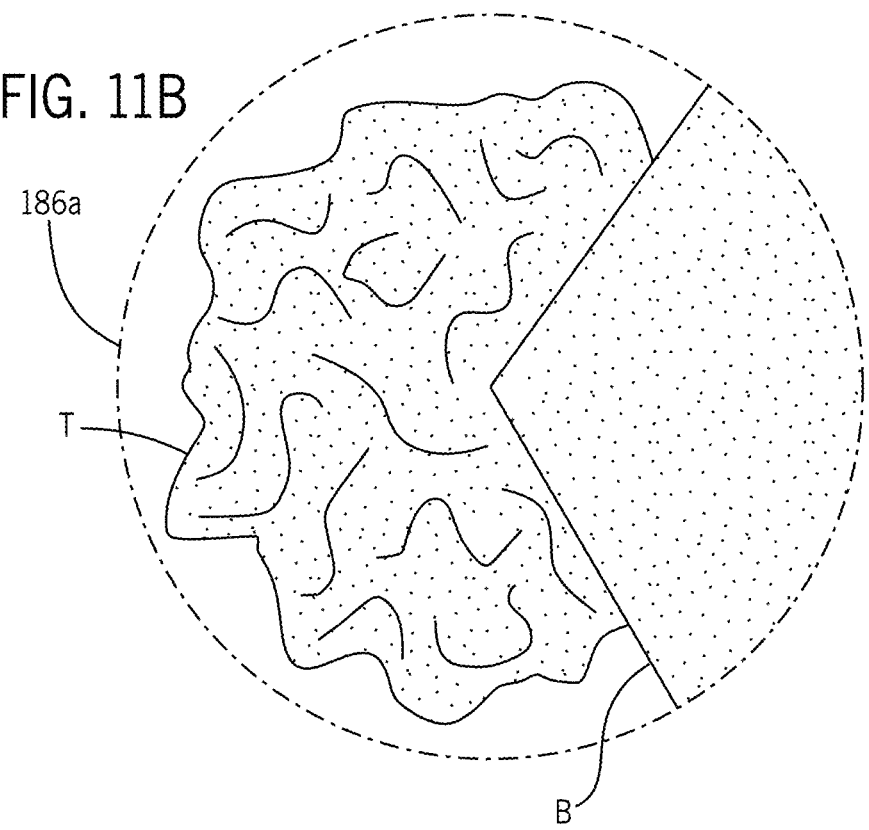
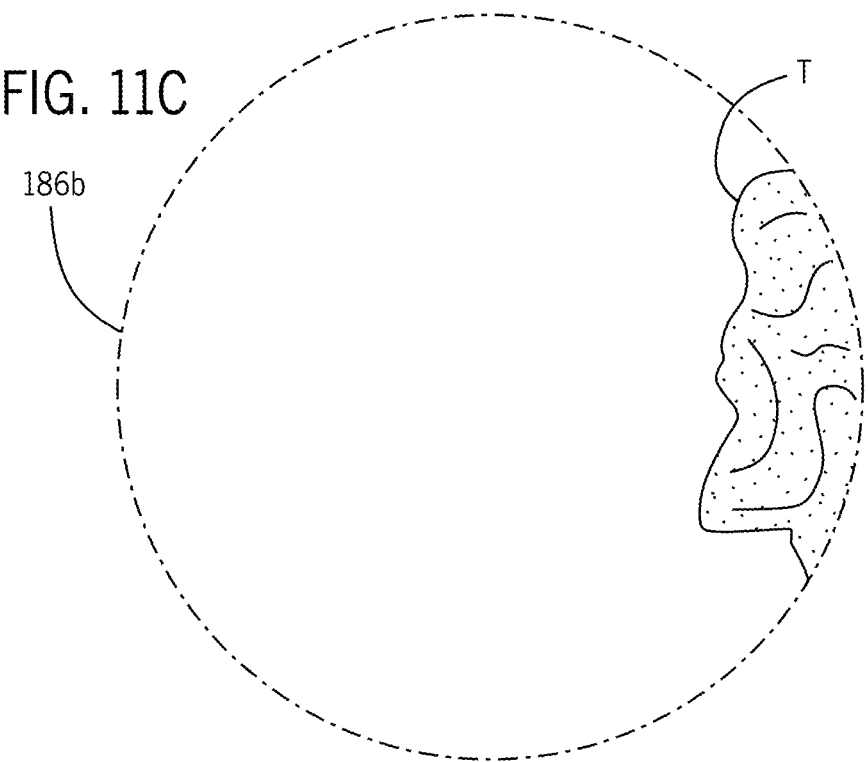

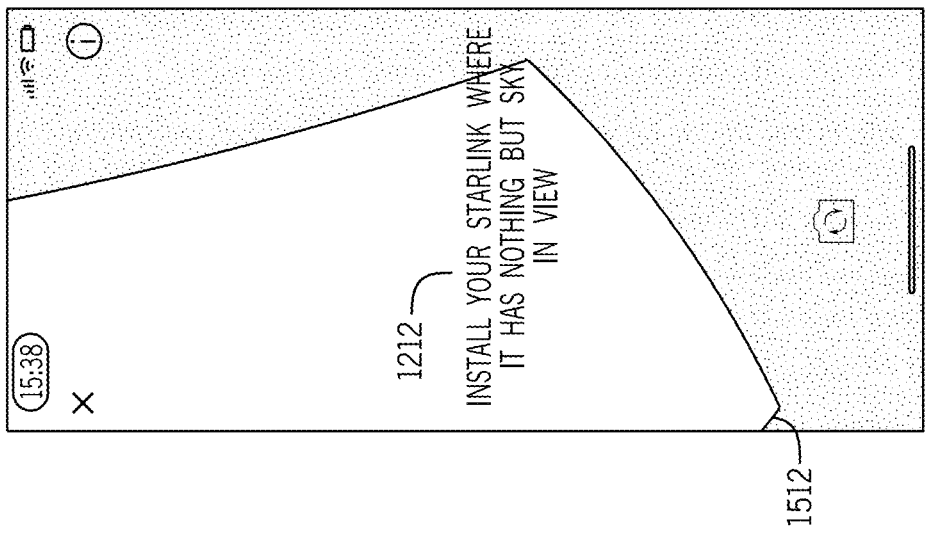
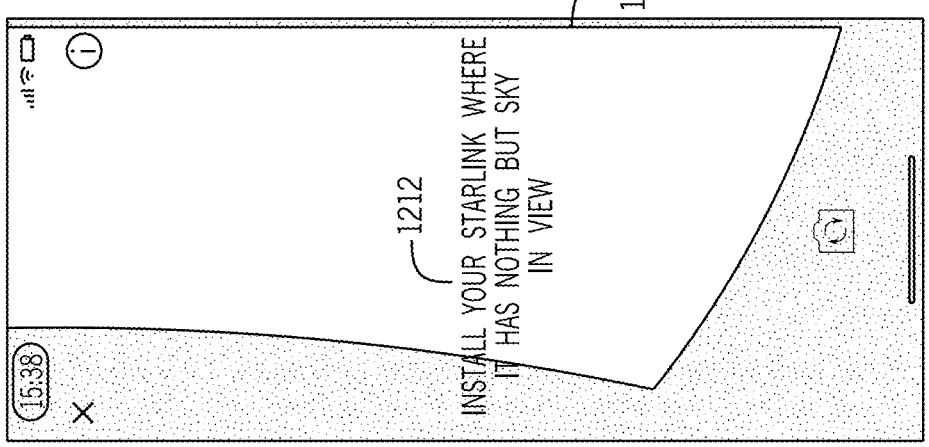
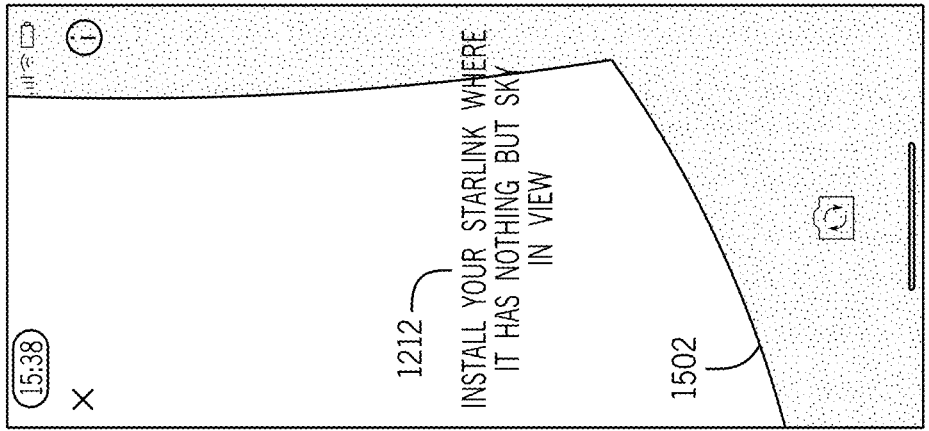

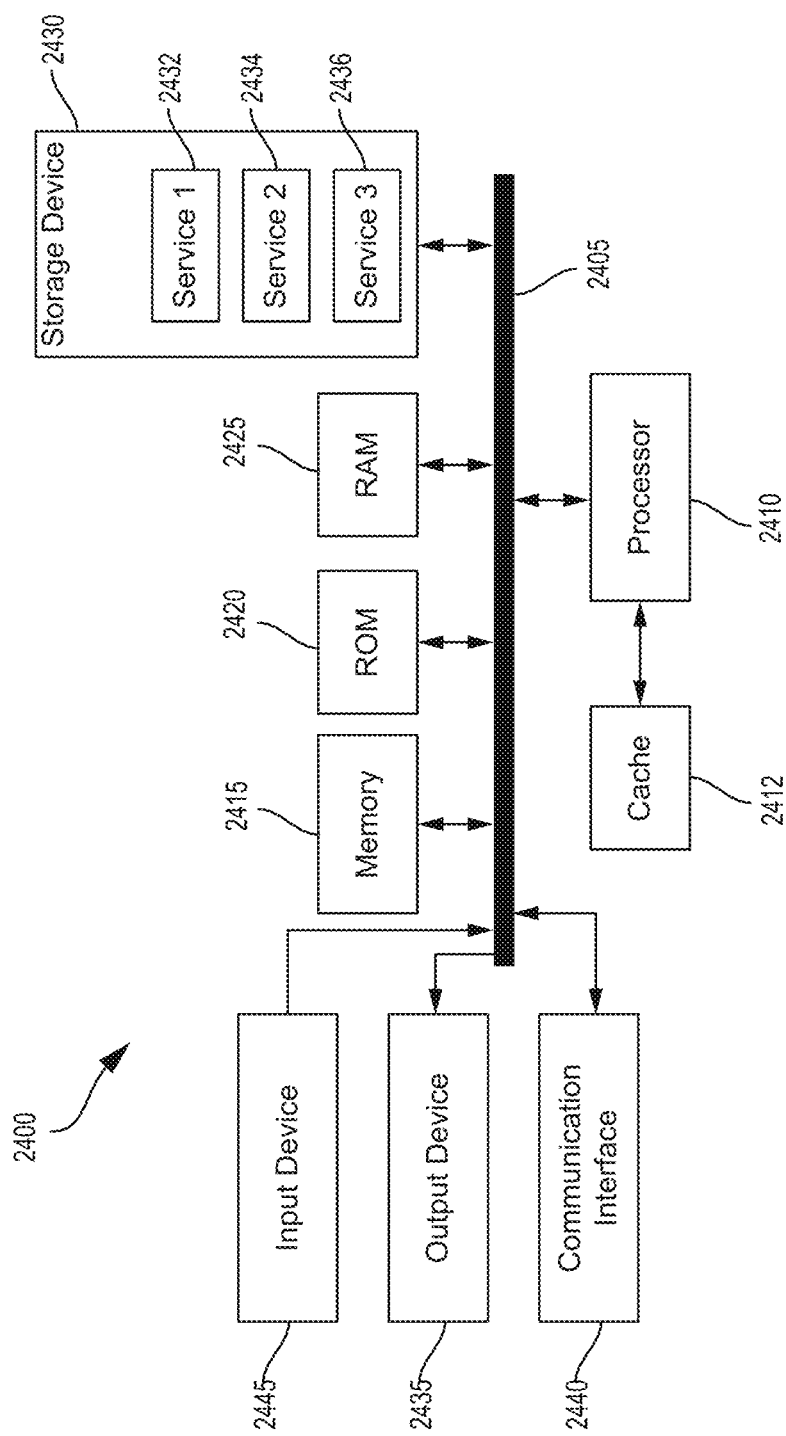

APPARATUSES AND METHODS FOR FACILITATING SATELLITE VISIBILITY FOR EARTH-BASED ANTENNA SYSTEMS

CROSS REFERENCE TO RELATED APPLICATIONS

The present application claims the benefit of U.S. Provisional Patent Application No. 63/091,254, filed on Oct. 13, 2020; U.S. Provisional Patent Application No. 63/179,110, filed on Apr. 23, 2021; and U.S. Provisional Patent Application No. 63/244,603, filed on Sep. 15, 2021.

BACKGROUND

Communication satellites receive and transmit radio signals from and to the surface of Earth for the purpose of providing communication services. In conventional satellite technology, only a few locations on Earth were in view of a satellite at any given time to transmit and/or receive signals to and/or from a satellite. In more modern satellite technology, it is desirable for every place on Earth be provided communication services at all times, a capability which may be referred to as universal or global coverage. In addition to global coverage, some locations on Earth, such as densely populated areas, require more communication capacity than others.

For global coverage having reduced latency, communication systems may employ non-geostationary satellites. Geostationary-Earth orbit (GEO) satellites orbit the equator with an orbital period of exactly one day at a high altitude, flying approximately 35,786 km above mean sea level. Therefore, GEO satellites remain in the same area of the sky as viewed from a specific location on Earth. In contrast, non-geostationary satellites typically operate in low-Earth or mid-Earth orbit (LEO or MEO) and do not remain stationary relative to a specific location on Earth.

Earth-based satellite communication systems are needed with improved global coverage and improved communication capacity with non-GEO satellite constellations. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a device for detecting a zone of communication between a phased array antenna and a satellite constellation including a plurality of satellites in non-geosynchronous orbit (non-GEO) is provided. The device includes one or more processors and memory. The memory stores thereon instructions that, as a result of being executed by the one or more processors, cause the device to: determine a location of the device, wherein the location corresponds to a field of regard for detecting the zone of communication between the phased array antenna and the satellite constellation, and wherein the field of regard corresponds to an antenna aperture of the phased array antenna; evaluate a level of communication between the phased array antenna and the satellite constellation associated with the field of regard; and output, to a user of the device, an indication of the level of communication between the phased array antenna and the satellite constellation associated with the field of regard.

In accordance with another embodiment of the present disclosure, a method for detecting a zone of communication between a phased array antenna and a satellite constellation including a plurality of non-GEO satellites is provided. The method includes: determining a location of a device, wherein the location corresponds to a field of regard for detecting the zone of communication between the phased array antenna and the satellite constellation, and wherein the field of regard corresponds to an antenna aperture of the phased array antenna; evaluating a level of communication between the phased array antenna and the satellite constellation associated with the field of regard; and outputting, to a user of the device, an indication of the level of communication between the phased array antenna and the satellite constellation associated with the field of regard.

In accordance with another embodiment of the present disclosure, a non-transitory computer-readable storing thereon executable instructions is provided. As a result of the executable instructions being executed by one or more processors of a computing device, the executable instructions cause the computing device to: determine a location of the computing device, wherein the location corresponds to a field of regard for detecting the zone of communication between a phased array antenna and a satellite constellation including a plurality of satellites in non-GEO orbit, and wherein the field of regard corresponds to an antenna aperture of the phased array antenna; evaluate a level of communication between the phased array antenna and the satellite constellation associated with the field of regard; and output, to a user of the computing device, an indication of the level of communication between the phased array antenna and the satellite constellation associated with the field of regard.

In accordance with another embodiment of the present disclosure, a device for detecting a zone of communication between a phased array antenna and a satellite constellation including a plurality of satellites in non-GEO orbit is provided. The device includes one or more processors and memory. The memory stores thereon instructions that, as a result of being executed by the one or more processors, cause the device to: determine a location of the device; determine an original field of regard corresponding to an antenna aperture of the phased array antenna, wherein the original field of regard is associated with a level of communication between the phased array antenna and the satellite constellation; modify the original field of regard for detecting the zone of communication between the phased array antenna and the satellite constellation to generate a modified field of regard, wherein the original field of regard is modified based on one or more factors; and output, to a user of the device, an indication of a modified level of communication between the phased array antenna and the satellite constellation associated with the modified field of regard.

In accordance with another embodiment of the present disclosure, a method for detecting a zone of communication between a phased array antenna and a satellite constellation including a plurality of non-GEO satellites is provided. The method includes: determining a location of a device; determining an original field of regard corresponding to an antenna aperture of the phased array antenna, wherein the original field of regard is associated with a level of communication between the phased array antenna and the satellite constellation; modifying the original field of regard for detecting the zone of communication between the phased array antenna and the satellite constellation to generate a modified field of regard, wherein the original field of regard is modified based on one or more factors; and outputting, to a user of the device, an indication of a modified level of communication between the phased array antenna and the satellite constellation associated with the modified field of regard.

In accordance with another embodiment of the present disclosure, a non-transitory computer-readable storing thereon executable instructions is provided. As a result of the executable instructions being executed by one or more processors of a computing device, the executable instructions cause the computing device to: determine a location of the device; determine an original field of regard corresponding to an antenna aperture of a phased array antenna, wherein the original field of regard is associated with a level of communication between the phased array antenna and a satellite constellation including a plurality of satellites in non-GEO orbit; modify the original field of regard for detecting the zone of communication between the phased array antenna and the satellite constellation to generate a modified field of regard, wherein the original field of regard is modified based on one or more factors; and output, to a user of the device, an indication of a modified level of communication between the phased array antenna and the satellite constellation associated with the modified field of regard.

In accordance with any of the embodiments described herein, the field of regard is modified to generate a modified field of regard, wherein the field of regard is modified based on one or more factors; and a new indication of a modified level of communication between the phased array antenna and the satellite constellation associated with the modified field of regard is outputted to the user of the device.

In accordance with any of the embodiments described herein, one or more obstructions are identified within the field of regard that prevent signals from being transmitted between the phased array antenna and the satellite constellation; the field of regard is modified to generate a modified field of regard, wherein the modified field of regard is determined based on the one or more obstructions; and a new indication of a modified level of communication between the phased array antenna and the satellite constellation associated with the modified field of regard is outputted to the user of the device.

In accordance with any of the embodiments described herein, modifying the field of regard further includes determining a signal-to-noise ratio (SNR) plot that that indicates a degree to which the one or more obstructions prevent the signals from being transmitted between the phased array antenna and the satellite constellation is determined.

In accordance with any of the embodiments described herein, the device further comprises a computer vision system configured to identify the one or more obstructions based on image data captured by an image sensor of the device.

In accordance with any of the embodiments described herein, outputting the indication of the level of communication between the phased array antenna and the satellite constellation includes displaying, within a display element of the device, a portion of the field of regard that is visible within a field of view (FOV) of an image sensor of the device.

In accordance with any of the embodiments described herein, further comprising determining that the level of communication associated with the field of regard is below a threshold level of communication; and outputting, to the user of the device, an instruction directing the user to move the device to a second location that is different than the location, wherein the second location corresponds to a second field of regard for detecting the zone of communication between the phased array antenna and the satellite constellation.

In accordance with any of the embodiments described herein, the one or more factors are selected from a set comprising a tilt angle of the antenna aperture of the phased array antenna, scan angle of the phased array antenna, a minimum elevation angle for the phased array antenna, a GEO-belt interference zone, and orbits of the plurality of satellites.

In accordance with any of the embodiments described herein, the one or more factors include one or more obstructions within the original field of regard that prevent signals from being transmitted between the phased array antenna and the satellite constellation, wherein the one or more obstructions are identified based on image data corresponding to the original field of regard.

In accordance with any of the embodiments described herein, the modified field of regard corresponds to a mask mapped onto a spherical section representing a sky view at the location, wherein the mask is generated based on the one or more factors.

In accordance with any of the embodiments described herein, outputting the indication of the modified level of communication between the phased array antenna and the satellite constellation includes displaying, within a display element of the device, a portion of the modified field of regard that is visible within a FOV of an image sensor of the device.

In accordance with any of the embodiments described herein, determining the original field of regard includes: outputting, to the user of the device, a graphical representation of the original field of regard, wherein the graphical representation of the original field of regard includes an indication of image data required to determine the level of communication; obtaining the image data, wherein the indication of the image data is updated as the image data is obtained; and updating the indication of the image data required to determine the level of communication in real-time as the image data is captured.

In accordance with any of the embodiments described herein, the indication of the image data required to determine the level of communication includes a percentage of the original field of regard scanned using the device and a set of graphical dots, and wherein the set of graphical dots denote regions of the original field of regard yet to be scanned using the device.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIGS. 7A, 7B, 7C are side views of an exemplary user or end point terminal in various different orientations.

FIGS. 11A, 11B, and 11C are not-to-scale exemplary schematic diagrams illustrating a user or end point terminal having a communication zone adjacent obstructing features.

FIGS. 15A, 15B, and 15C are exemplary illustrations of fields of regard generated based on various factors and mapped onto a hemispherical or spherical section representing a sky view from an Earth-based antenna system.

FIG. 24 is an exemplary block diagram of a computing device architecture of a computing device which can implement the various techniques described herein.

DETAILED DESCRIPTION

Figure 1:
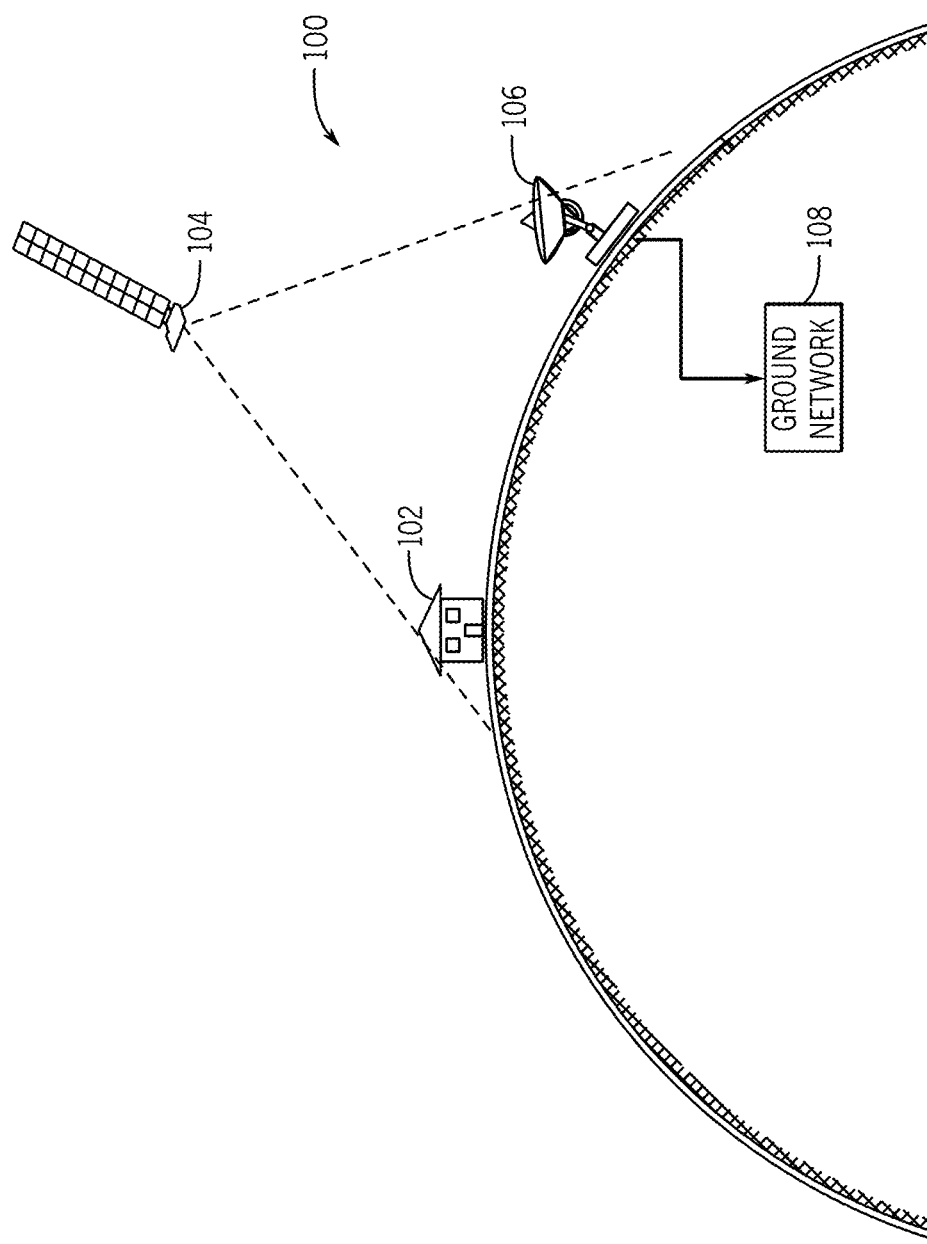
FIG. 1 is a not-to-scale schematic diagram illustrating a simple example of communication in a satellite communication system.

Systems are currently being deployed to provide high-bandwidth, low-latency network communication via constellations of satellites in low Earth orbit (LEO). FIG. 1 is a not-to-scale schematic diagram that illustrates a simple example of communication in such a system 100. An endpoint terminal 102 is installed at a house, a business, a vehicle, or another location where it is desired to obtain communication access via a network of satellites. A communication path is established between the endpoint terminal 102 and a first satellite 104. In the illustrated embodiment, the first satellite 104, in turn, establishes a communication path with a gateway terminal 106. In another embodiment, the first satellite 104 may establish a communication path with another satellite prior to communication with a gateway terminal 106. The gateway terminal 106 is physically connected via fiber optic, Ethernet, or another physical connection to a ground network 108. The ground network 108 may be any type of network, including the Internet.

Latency of communication between the endpoint terminal 102 and the ground network 108 is determined at least in part by the distance between the endpoint terminal 102 and the satellite 104, and the distance between the satellite 104 and the gateway terminal 106. For previous satellite communication systems that used satellites in geosynchronous or geostationary Earth orbit (GEO), the large distances involved created high amounts of latency. Therefore, it is desirable to use constellations of satellites in non-GEO orbit, for example, low Earth orbit (LEO), for communication systems.

Embodiments of the present disclosure are directed to configurations for endpoint terminals 102 (or user terminals) to optimize network communications to and from satellite constellations. In particular, the exemplary embodiments disclosed herein relate to systems and methods for positioning endpoint terminals 102 based on obstructions that may prevent signals from being transmitted between the endpoint terminals 102 and satellites within satellite constellations.

An Earth-based endpoint terminal 102 may be a terminal connected to Earth or as a non-orbiting body positioned in the Earth's atmosphere, such as a non-mobile atmospheric platform. For example, an Earth-based endpoint terminal 102 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a stationary object, such as a balloon.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

Satellite Constellations

The satellite constellations of the present disclosure are in non-geostationary orbits. A satellite in a geostationary orbit is at an altitude of approximately 35,786 km above mean sea level. Satellite constellations of the present disclosure are at lower altitudes. In one embodiment of the present disclosure, the satellite constellation of the present disclosure is at an altitude of less than 10,000 km. In another embodiment, the satellite constellation of the present disclosure is in a low Earth orbit at an altitude of less than 2000 km. In another embodiment, the satellite constellation of the present disclosure is in a very low Earth orbit at an altitude of less than 500 km.

User or endpoint terminals 102 of the present systems 100 are designed and configured in accordance with embodiments of the present disclosure to work in conjunction with LEO satellite constellations. Because LEO satellite constellations, unlike GEO satellite constellations, do not remain stationary relative to a specific location on Earth, such changes are accommodated in the design of the satellite constellation and the user terminals 102. The drifting nature of LEO satellite constellations is described in greater detail below.

Unsynchronized (Drifting) Orbital Planes

Figure 2A:
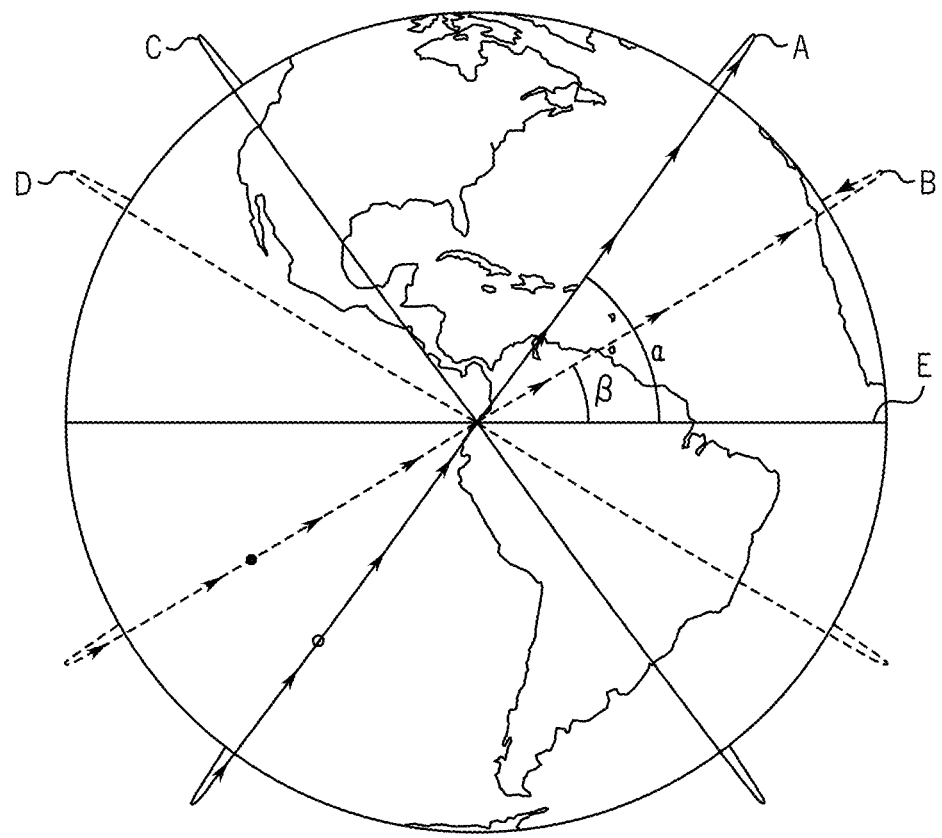
FIGS. 2A and 2B are schematic diagrams illustrating first and second satellite systems having different inclinations and similar altitudes resulting in drifting orbital planes in accordance with previously developed satellite constellation technology.

Referring to FIG. 2A, a constellation of satellites is provided. The constellation shows four satellite orbits in four different orbital planes, including satellites strings A, B, C, and D. For simplification in the illustrated embodiment, the satellite strings include one satellite. However, in accordance with embodiments of the present disclosure, each satellite string includes a plurality of satellites following each other in the path of the orbital plane.

Satellite strings A, B, C, D are at similar altitudes, but at different inclinations, inclinations angle A and inclination angle B. For example, string A is at an inclination α of about 55 degrees relative to the equator E and string B is at an inclination β of about 32 degrees relative to the equator E. Satellite strings C and D mirror satellite strings A and B.

The altitudes of the satellite strings are not exactly the same to avoid collision of satellites in different systems, but they are within close range of each other, such that altitude is a minimal factor in the different operating characteristics of the first and second satellite strings A and B. For example, satellite string A and satellite string B may be in an altitude range of a few kilometers, less than 200 km.

Figure 2B:
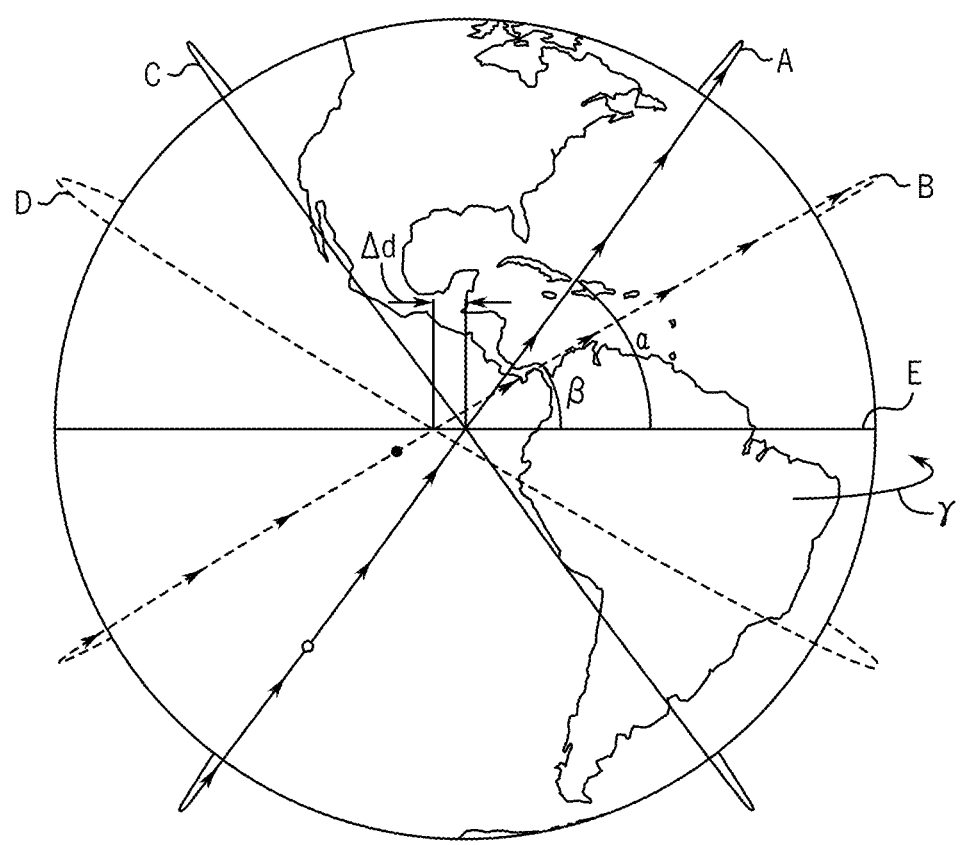

Referring to FIG. 2B, the two satellite strings A and B of FIG. 2A have different westward drift rates in view of their different inclinations A and B. Therefore, after a period of time, as the Earth rotates in the eastward direction as indicated by arrow γ in FIG. 2B, both satellite strings A and B have drifted westward. However, the second string of satellites B has drifted more westward than the first string of satellites A, as shown by drift differential Δd.

The drift differential Δd between the first and second satellite strings A and B can be undesirable because it adds uncertainty to the meshing between the two areas of coverage by the two satellite strings A and B. Meshing or interleaving between satellite strings can be desirable in communication systems that depend on a known satellite constellation for predictable satellite coverage.

Figure 2C:
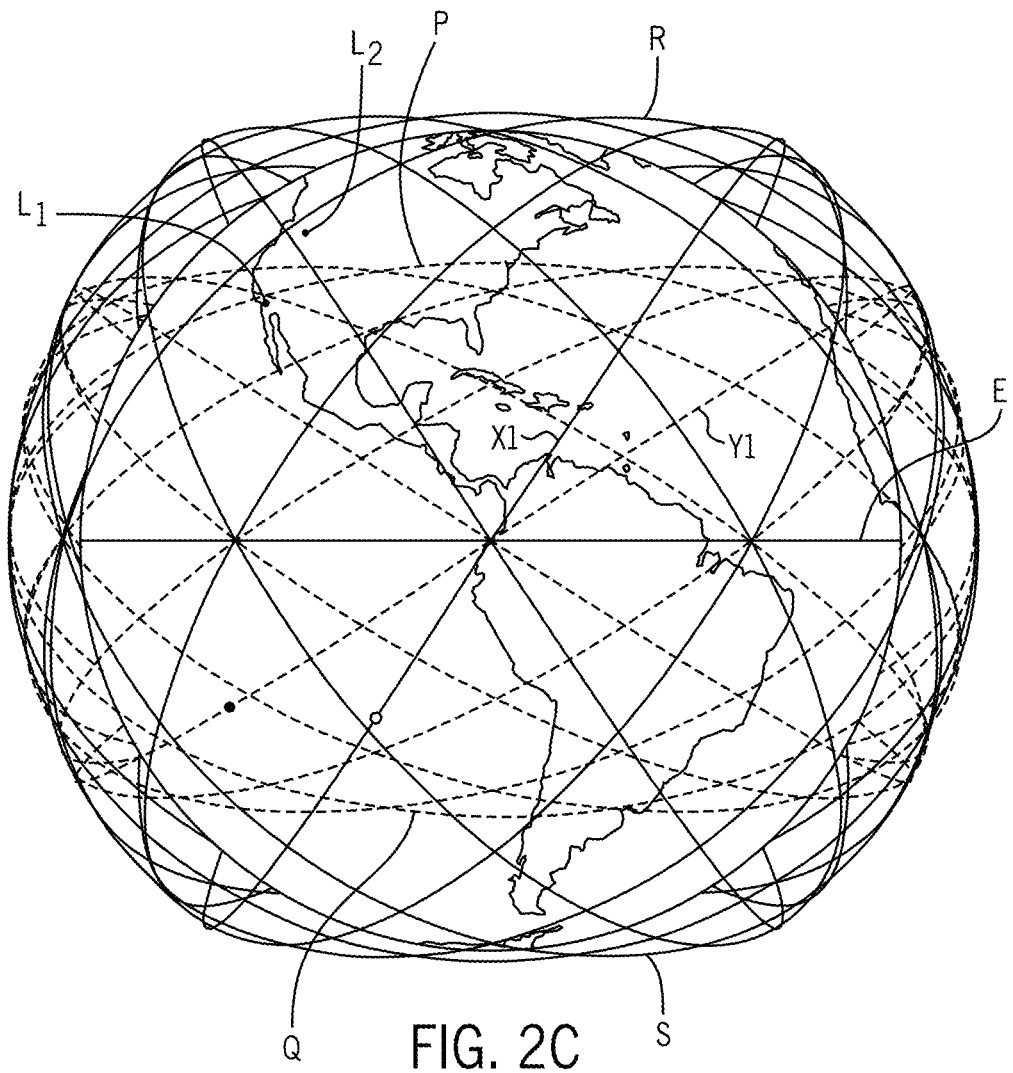
FIG. 2C is a schematic showing satellite planar orbital patterns on a rotating Earth for two different satellites as two different inclinations (without accounting for drift differential) in accordance with embodiments of the present disclosure.

Referring to FIG. 2C, in a frame that rotates with the Earth, satellites in the first and second satellite strings X1 and Y1 are in discrete orbits, each defining an orbital path and each satellite string X1 and Y1 having a different inclination, similar to the satellite constellation. The satellite system may be designed with the required number of loops to be repeating ground track systems or may have a drifting pattern relative to the Earth's rotation rate. Meshing or interleaving between satellite strings is desirable in communication systems that depend on a known satellite constellation for predictable satellite coverage.

As seen in the three-dimensional satellite travel paths of FIG. 2C, the orbital track of satellites traveling at a certain inclination angle and the geometry of the Earth create a higher density of satellites near the northern-most and southern-most planes of latitude as compared to near the equator. Assuming each satellite string X1 or Y1 in FIG. 2C has a known number of equally spaced or substantially equally spaced satellites traveling in a planar orbit circling the Earth, the orbital pattern of a satellite constellation at a specific inclination angle (compare the orbital patterns of X1 and Y1 at different inclination angles) and the geometry of the Earth create a swarm of satellites at or near the upper and lower limiting latitudes of the orbital path.

For a prograde orbit, the upper and lower limiting latitudes of the orbital path (indicated as P and Q for satellite string X1 in FIG. 2C or R and S for satellite string Y1 in FIG. 2C) typically correspond to the angle of inclination of the satellite. For example, a satellite string X1 having an angle of inclination of 42 degrees has upper and lower limiting latitudes P and Q of 42 degrees north of the equator and 42 degrees south of the equator. For a retrograde orbit, the upper and lower limiting latitudes of the orbital path correspond to 180 degrees minus the inclination angle. For example, a satellite having an angle of inclination of 138 degrees also has and upper and lower limiting latitude of 42 degrees Likewise, a satellite string Y1 having an angle of inclination of 53 degrees has upper and lower limiting latitudes R and S of 53 degrees north of the equator and 53 degrees south of the equator.

User Terminal Having a Steerable Beam and a Limited Field of Regard

In accordance with one embodiment of the present disclosure, a user terminal is configured for communication with a LEO satellite constellation consisting of satellites which emit or receive radio frequency (RF signals).

An antenna (e.g., a dipole antenna, parabolic antenna, or patch antenna) typically generates or receives radiation in a pattern that has a preferred direction, known as the main beam. Signal quality (e.g., signal to noise ratio or SNR), whether in transmitting or receiving scenarios, can be improved by aligning, or steering, the main beam of the antenna with a direction of the target or source of signal. In electronically steered antenna systems, a plurality of individual antenna elements are employed together to reorient, or steer, the main beam relative to those physically fixed antenna elements. In mechanically steered antenna systems, a single or multiple antenna elements are physically moved to reorient the main beam.

Because LEO satellite constellations, unlike GEO satellite constellations, do not remain stationary relative to a specific location on Earth, the user terminal of the present embodiment is configured with an antenna system having an antenna aperture with at least one degree of freedom to orient this preferred direction of transmitting or receiving electromagnetic radiation. This steering may be accomplished either electronic or mechanical means, or a combination thereof.

In accordance with the embodiments of the present disclosure, the user terminal is incapable of steering its main beam to address the entire hemisphere of the sky as defined by the local horizon of the location of the user terminal on the Earth. This steering limitation is the result of mechanical, regulatory, or electrical limitations of the beam steering technology used in the user terminal. The area in which this antenna is capable of steering to for communication is referred to as the field of regard, or interchangeably the communication zone. An antenna which is incapable of steering its beam to address any arbitrary location within its local hemisphere of sky is referred hereafter as a limited field of regard antenna.

User Terminal Having a Phased Array Antenna

In accordance with one illustrative embodiment of the present disclosure, a user terminal may be configured with a phased array antenna that electronically steers in one or two directions. The phased array antenna includes array antenna aperture defined by a lattice of a plurality of antenna elements configured to transmit and/or receive signals in a preferred direction (i.e., the antenna's beamforming ability) without physically repositioning or reorienting the system.

Figure 3:
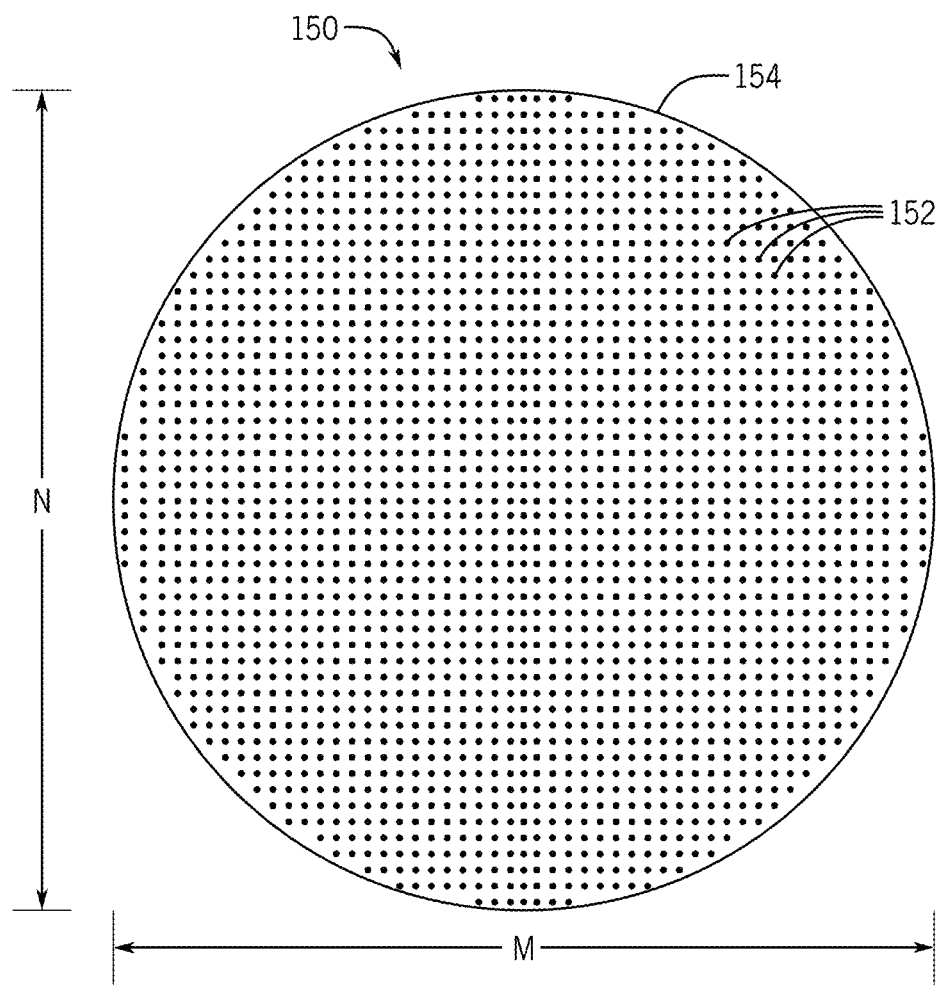
FIG. 3 is an exemplary schematic diagram illustrating a layout of plurality of individual antenna elements of a phased array antenna in accordance with embodiments of the present disclosure.

FIG. 3 shows am exemplary schematic layout or lattice 150 of individual antenna elements 152i of a phased array antenna. The illustrated phased array antenna lattice 150 included antenna elements 152i that are arranged in a 2D array of M columns by N rows. For example, the phased array antenna lattice 150 has a generally circular or polygonal arrangement of the antenna elements 152i. In other embodiments, the phased array antenna may have another arrangement of antenna elements, for example, a square arrangement or other polygonal arrangement of the antenna elements. The antenna elements 152i in the antenna lattice 150 can be phase offset such that the phased array antenna emits a waveform in a preferred direction. When the phase offsets to individual antenna elements are properly applied, the combined wave front has a desired directivity of the main lobe.

Figure 8:
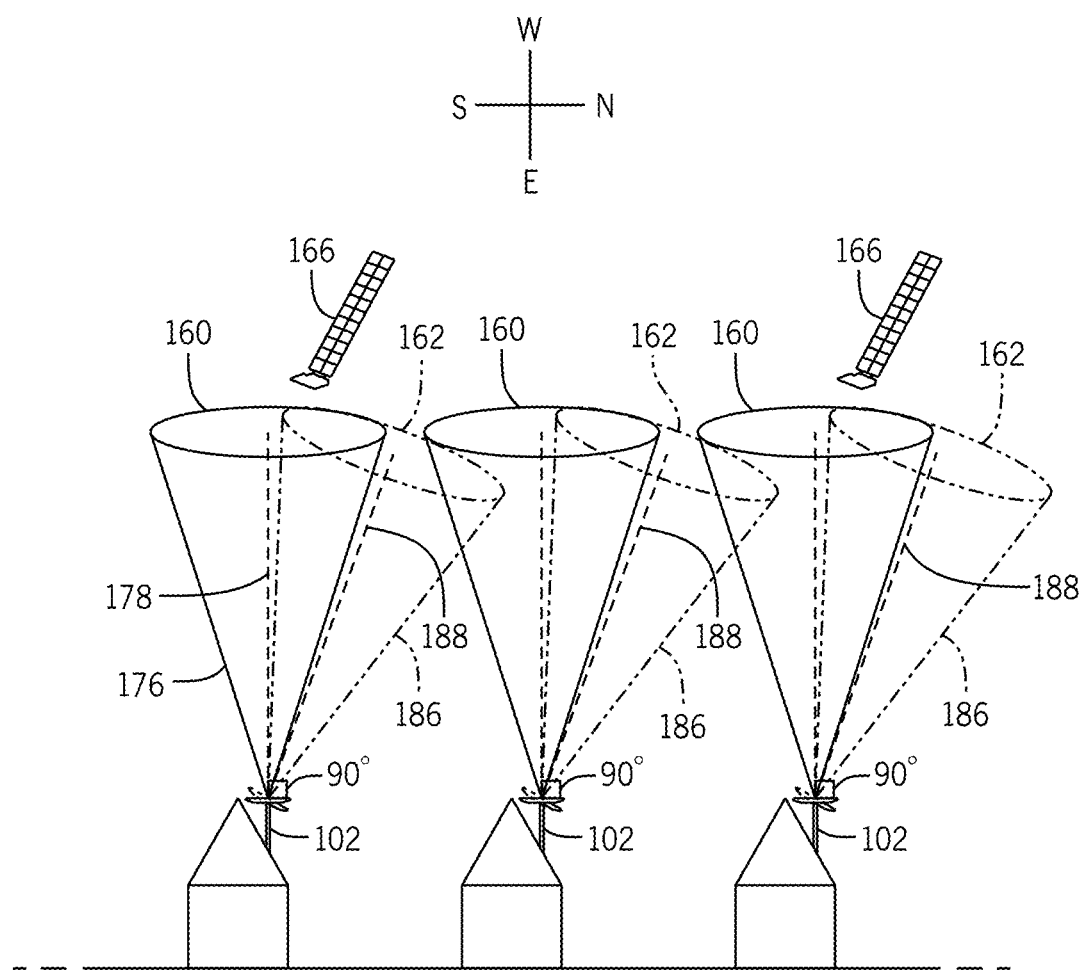
FIG. 8 is a not-to-scale exemplary schematic diagram illustrating a plurality of adjacent user or end point terminals having communication zones.

Referring to the exemplary embodiment in FIG. 8, a phased array antenna aperture 154 can generate a communication zone 176 having a boresight vector (illustrated as the central longitudinal axis 178 of the communication zone 176) and field of regard 160. The shape of the communication zone 176 may be defined by the shape of the antenna aperture 154. In a non-limiting example where the antenna aperture 154 is circular, the communication zone 176 may be generally conically shaped. In a non-limiting example where the antenna aperture 154 is square, the communication zone 176 may be generally pyramidal. The field of regard 160 is a function of the angle the phased array antenna can steer from its boresight vector 178. In the case of an electrically steering phased array antenna, the field of regard is a limited field of regard which is less than the total sky view of a particular use at a specific location.

Field of Regard for a Phased Array Antenna

Figure 4:
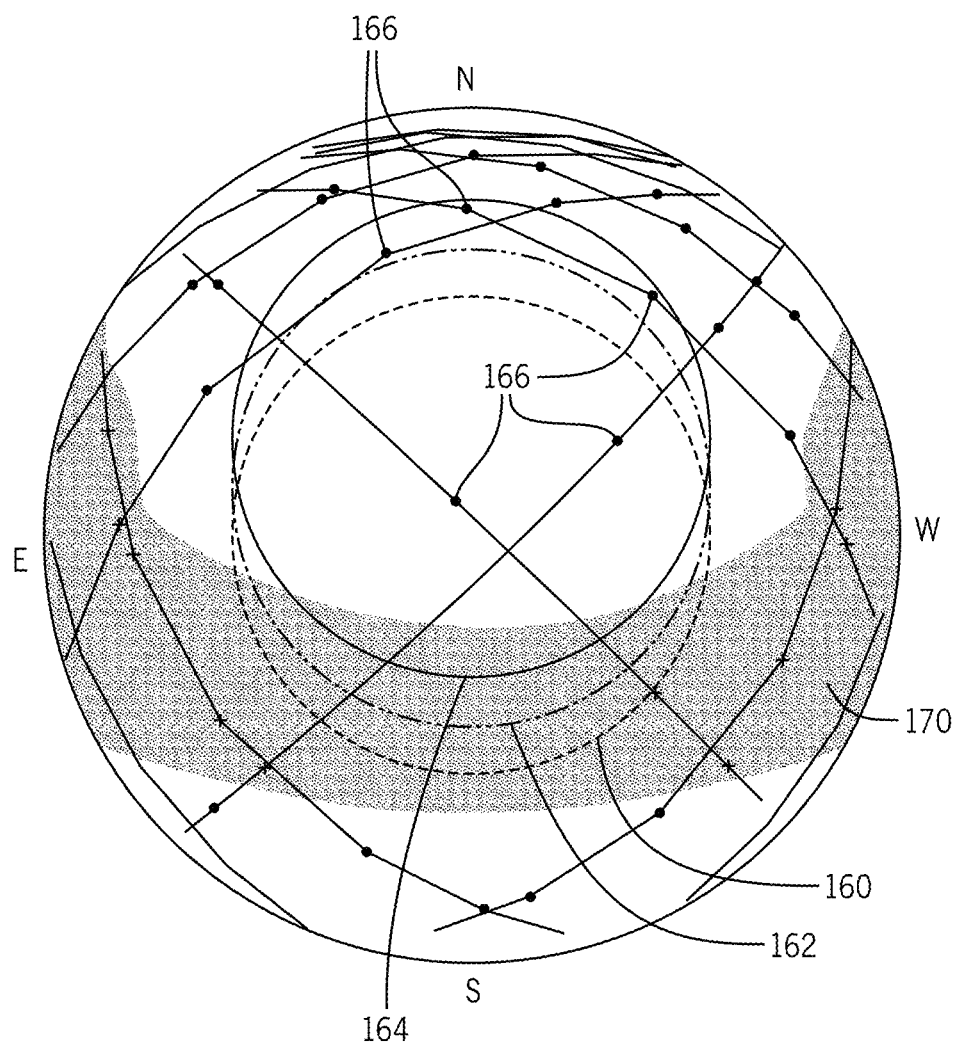
FIGS. 4 and 5 are exemplary schematic diagrams of the sky view of a user or end point terminal showing satellites in the constellation in view and the GEO-belt.
Figure 5:
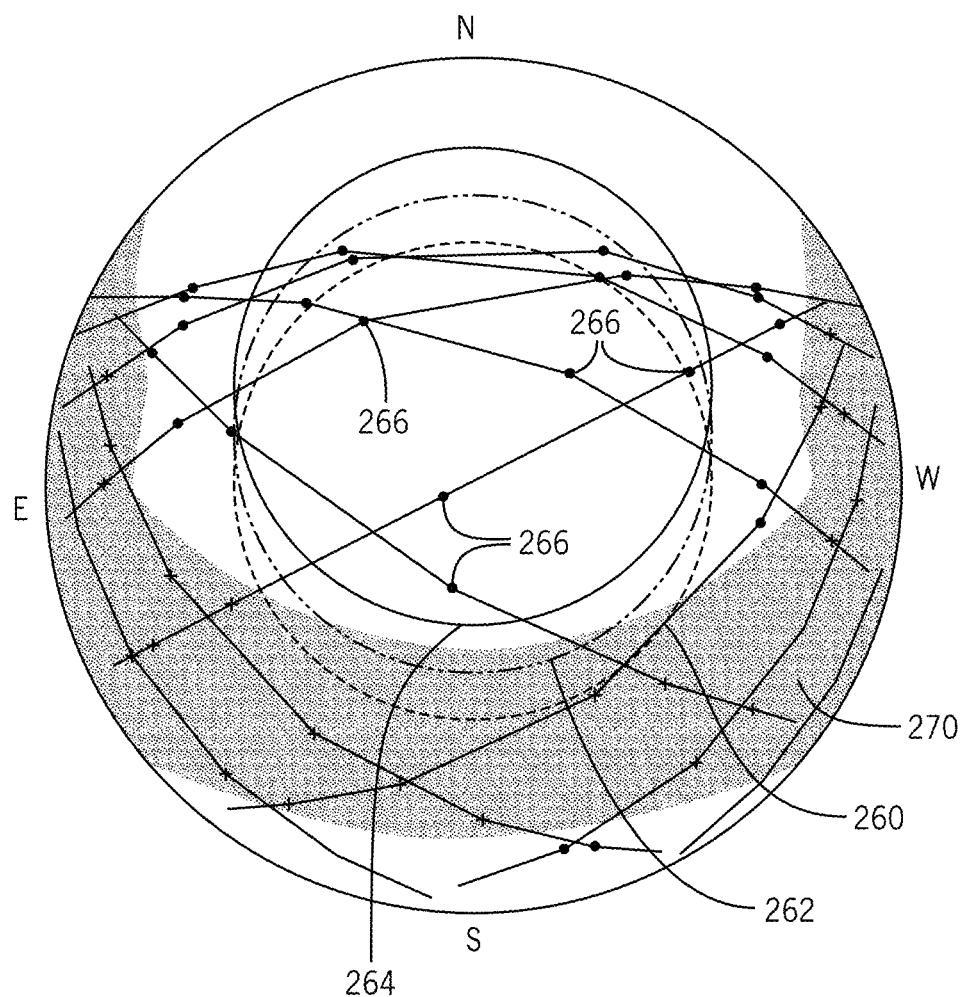

Referring to FIG. 4, an upward sky view is provided for exemplary user terminal in Los Angeles, California, United States, illustrating a field of regard 160 for an exemplary two-dimensional phased array antenna. Because the user terminal is looking upward at the sky, East and West direction indicators are transposed. Referring to FIG. 5, in another location using the same two-dimensional phased array antenna, an upward sky view is provided for a user terminal in Seattle, Washington, United States, illustrating a similar field of regard 260.

In the illustrated fields of regard 160 and 260 of FIGS. 4 and 5, upward sky views of visible satellites 166 (FIG. 4) and 266 (FIG. 5) in the satellite constellation (for example, one of the exemplary constellations of FIG. 2C) are shown. The visible satellites 166 and 266 in the respective fields of regard 160 (FIG. 4) and 260 (FIG. 5) are available for communication.

The exemplary fields of regard 160 and 260 in the respective illustrated embodiments of FIGS. 4 and 5 are designed to be generally circular in configuration, inscribing the largest angle to which the antenna system is capable of (or configured to) steer as measured from the boresight vector of the antenna system. However, depending on the design and configuration of the phased array antenna and the antenna aperture in the user terminal, the field of regard may have other shapes (for example, a square shape, a polygonal shape, or another suitable shape).

Design of the User Terminal

Referring now to FIGS. 7A, 7B, and 7C, an exemplary user terminal 180 is designed and configured to allow for tilt-ability of the housing 182 for a phased array antenna aperture 154 (see FIG. 3) relative to its mount, such as by a mounting leg 184. Such tilt-ability of the phased array antenna aperture 154 allows for not only rain and snow removal and heat dissipation, but also for orientation of the field of regard 160a with the sky for enhanced radio frequency communication with one or more satellites depending on the geolocation of the phased array antenna aperture 154 and the orbit of the satellite constellation.

FIGS. 7A, 7B, and 7C illustrate exemplary limits of tilt-ability of an exemplary phased array antenna system having an exemplary mounting system of the illustrated embodiment, with FIG. 7A showing an antenna aperture 154 tilted to full vertical tilt relative to a mounting leg 184, FIG. 7C showing the antenna aperture 154 tilted to near horizontal relative to the mounting leg 184, and with FIG. 7B showing a middle tilt position. However, other tilting positions and tilting configurations are within the scope of the present disclosure. The user terminal 180 of FIGS. 7A-7C is merely an exemplary illustration of a user terminal 180 having a tilt-able antenna aperture 154. For example, in other non-limiting embodiments, the user terminal may have other tilt-ability mechanisms or the housing may remain fixed and the antenna aperture may be tilt-able.

Geobelt

Still referring to FIGS. 4 and 5, the shaded areas 170 and 270 in the sky views illustrate the GEO-belt of satellites in geosynchronous equatorial orbit (GEO). See also FIG. 6 for an illustration of the GEO-belt of satellites 172. A GEO orbit is a circular orbit 35,786 km (22,236 mi) above Earth's equator and following the direction of Earth's rotation. An object in GEO orbit has an orbital period equal to the Earth's rotational period. Therefore, to ground observers, the satellite appears motionless at a fixed position in the sky.

Many satellites co-exist in the GEO-belt. For example, communications satellites are often placed in a GEO orbit so that Earth based satellite antennas can be pointed permanently at the position in the sky where the satellites are located and do not need to be rotated for tracking. Further, weather satellites in GEO orbit for real time monitoring and data collection, and navigation satellites in GEO orbit to provide a known calibration point to enhance GPS accuracy.

Within the GEO-belt, weather or earth observation satellites might not interfere with GEO-belt communication satellites. However, broadcast or communication satellites are typically spaced to avoid frequency interference or overlap. In addition to proper spacing between satellites within the GEO-belt, communication satellites in other orbits, such as LEO and MEO orbits, can be designed and configured to avoid interference with already existing GEO communication satellites.

Figure 6:
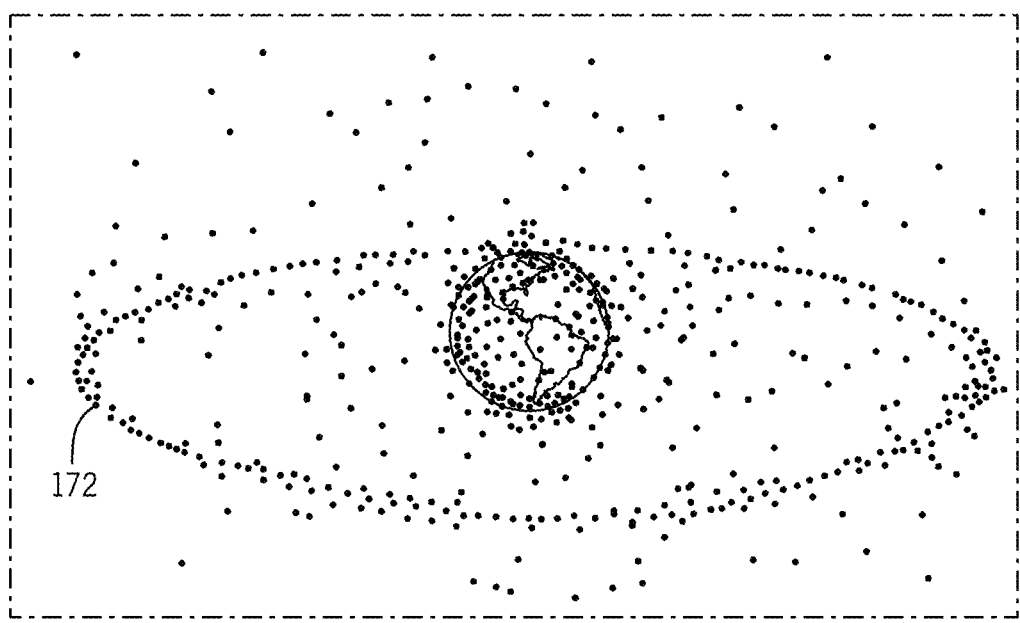
FIG. 6 is a not-to-scale exemplary schematic diagram illustrating the GEO-belt of geostationary satellites orbiting the equator with an orbital period of exactly one day (flying at an altitude of approximately 35,786 km above mean sea level).

Referring to FIG. 6, a not-to-scale simplified illustration of Earth and its satellites is provided, which shows the line formed by the GEO-belt 172 of satellites. Returning to FIGS. 4 and 5, the respective shaded areas 170 and 270 show what the potential interference zone for the GEO-belt 172 of satellites in geosynchronous equatorial orbit (GEO) look like in the fields of regard (e.g., 160 in FIGS. 4 and 260 in FIG. 5) of a user terminal having a phased array antenna.

Depending on the latitude of the user terminal, the view of the GEO belt interference zone 170 or 270 with respect to the field of regard 160 or 260 may change. For example, FIG. 4 illustrates a sky view for a user terminal in Los Angeles, California, at a latitude of 34.0522° N (see L1 in FIG. 5). In contrast, FIG. 4 illustrates a sky view for a user terminal in Seattle, Washington, at a latitude of 47.6062° N (see L2 in FIG. 5).

Although, the GEO-belt 172 seen in FIG. 6 is generally comprised of a band of satellites located in space at a certain altitude above Earth's equator and following the direction of Earth's rotation, the GEO-belt interference zone 170 or 270 is a larger range of communication interference based on the performance of an antenna system to avoid interference with the GEO belt. For example, in accordance with embodiments of the present application, the GEO-belt interference zone may be in a range of +/−5 to 30 degrees of the GEO-belt.

In the illustrated embodiment of the present application, the GEO-belt interference zone 170 or 270 is defined as +/−18 degrees of the GEO-belt 172. Therefore, the shaded areas 170 and 270 representing the GEO-belt interference zones 170 and 270 in respective FIGS. 4 and 5 are sized to represent the communication interference zone of +/−18 degrees of the GEO-belt 172.

As seen in the illustrated examples of FIGS. 4 and 5, the GEO-belt interference zone 170 or 270 is more centered in the sky view of user terminals positioned closer to the equator. Because Los Angeles L1 is closer to the equator E than Seattle L2 (see FIG. 2C), the GEO-belt interference zone 170 has a greater degree of overlap with the field of regard 160 for an antenna system having a substantially vertical central vector (see central boresight vector 178 in FIG. 8 for field of regard 160) in Los Angeles in FIG. 4 than in the field of regard 260 for an antenna system having a substantially vertical central vector in Seattle in FIG. 5. Therefore, a greater tilt angle for the user terminal is generally used if the user terminal is positioned closer to the equator within the upper and lower limits of the satellite string orbital path (see FIG. 2C) to reduce the amount of overlap between the field of regard and the GEO-belt interference zone.

Figure 9:
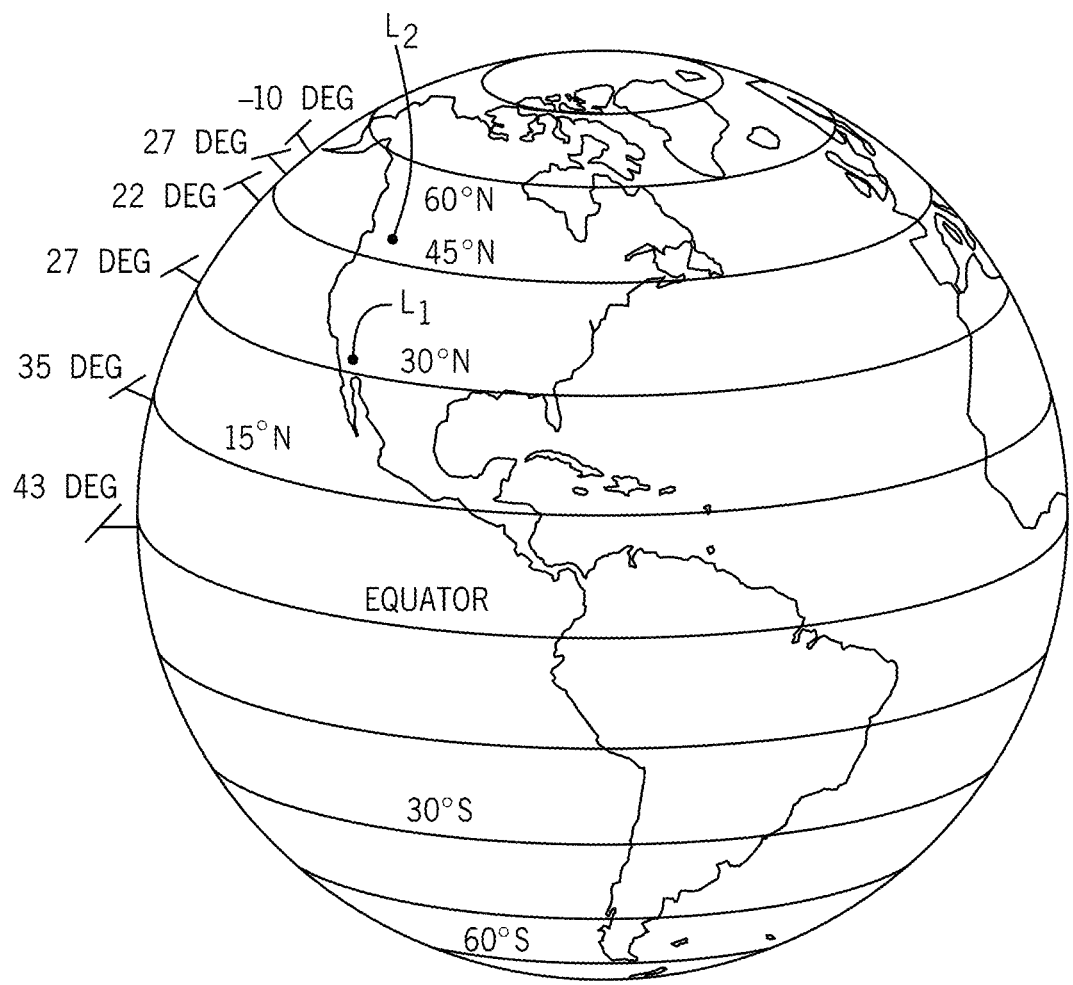
FIG. 9 is a not-to-scale schematic illustrating exemplary tilt angles at various latitude lines for a satellite constellation having a particular angle of inclination in accordance with embodiments of the present disclosure.

As a non-limiting example, FIG. 9 shows the user terminal as being tilted in a range of −10 to 43 degrees in the northern hemisphere, depending on the latitudinal positioning of the user terminal and the angle of inclination of the orbital path of the satellite string (for example, 42 degrees as seen for orbital path X1 in FIG. 2C). For example, the user terminal may be tilted 22 degrees in Seattle and 27 degrees in Los Angeles, and more than 30 degrees in south Florida.

Tilting Depending on Latitude

Returning to FIGS. 4 and 5, the tilt of the phased array antenna aperture 154 of the user terminal can be selected based on the latitude of the user terminal, for example, see L1 for Los Angeles and L2 for Seattle in FIG. 2C. Referring to FIG. 4, the field of regard can be adjusted from a non-tilted field of regard 160 to a first exemplary tilted field of regard 162 at a first northward tilt angle away from the Earth's equator or a second exemplary tilted field of regard 164 at a second northward tilt angle away from the Earth's equator. Compare also in FIG. 8, a non-tilted field of regard 160 with a tilted field of regard 162.

In accordance with embodiments of the present disclosure, an antenna system is an antenna having an antenna aperture with a defined limited field of regard. In some embodiments described herein, an antenna system (such as a phased array antenna aperture) may be capable of electronic steering to steer its beam in a selected non-vertical direction. Such beam steering is to be distinguished from physical tilting of the antenna aperture and the field of regard it generates (as illustrated in FIG. 8).

In accordance with embodiments of the present disclosure, a non-tilted antenna is an antenna having a limited field of regard which has a central vector (or boresight vector) located in a substantially vertical orientation. The central vector is defined as the vector between the antenna aperture location and the geometric centroid of the antenna system's field of regard projected onto the hemisphere of the sky defined by the local horizon surrounding the antenna aperture location. A substantially vertical orientation is designed to be substantially perpendicular to a tangent plane to the Earth's mean surface (not accounting for geological features such as mountainous inclines or valley declines, which depending on altitude may further affect prescribed tilt angle).

In a non-limiting example of a planar phased array, a non-tilted flat phased array antenna system may include an antenna aperture surface oriented substantially parallel to a tangent plane to the Earth's mean surface (not accounting for geological features such as mountainous inclines or valley declines, which depending on altitude may further affect prescribed tilt angle). However, in other non-planar antenna systems, such as conformal phased array systems, a non-tilted antenna may not be oriented in a substantially horizontal orientation but still may have a substantially vertically oriented boresight vector.

Other exemplary tilted fields of regard may also be determined depending on the mesh of the satellite constellation in the field of regard 160, 162, and/or 164 of the user terminal. In the illustrated embodiment, the first and second tilted fields of regard 162 and 164 show reduced overlap with the GEO-belt interference zone 170 and an increased number of satellites visible within that field of regard, with the second tilted field of regard 164 having no overlap with the GEO-belt interference zone 170 and an increased number of satellites visible within that field of regard.

Likewise, referring to FIG. 5, the field of regard can be adjusted from a first non-tilted field of regard 260 to a first exemplary tilted field of regard 262 at a first northward tilt angle away from the Earth's equator or a second exemplary tilted field of regard 264 at a second northward tilt angle way from the Earth's equator. The first and second tilted fields of regard 262 and 264 show reduced overlap with the GEO-belt interference zone 270 and an increased number of satellites visible within that field of regard, with the second tilted field of regard 264 having less overlap than the first tilted field of regard 262 and an increased number of satellites visible within that field of regard.

In the illustrated embodiments of FIGS. 4 and 5 for tilting of the field of regard, the tilting for the illustrated latitudes may be in the northward direction away from the Earth's equator. For other locations, such as equivalent latitudes to FIGS. 4 and 4 in the southern hemisphere, the tilting of the field of regard may be southward away from the Earth's equator.

For still other locations in the northern hemisphere, the tilting may be in the southward direction to optimize for the same parameters. Likewise, there may be locations in the southern hemisphere where tilting in the northward direction may be preferable to optimize for the same parameters. For example, as described above, the upper and lower limiting latitudes of the orbital path typically correspond to the angle of inclination of the satellite. For example, as seen in FIG. 2C, the orbital path of a satellite string X1 having an angle of inclination of 42 degrees has upper and lower limiting latitudes P and Q of 42 degrees north of the equator and 42 degrees south of the equator. Likewise, the orbital path of a satellite string Y2 having an angle of inclination of 53 degrees has upper and lower limiting latitudes of 53 degrees north of the equator and 53 degrees south of the equator. Above or below the upper and lower limiting latitudes of a satellite orbital path, the tilting may be in the opposite direction to tilt toward the swarm of satellites at or near the upper and lower limiting latitudes of the orbital path. See, for example, FIG. 9.

Accordingly, a method of orienting a user or endpoint terminal at an Earth-based location includes determining a latitude location of the Earth-based location for a limited field of regard antenna for communication with a non-GEO satellite constellation. Based on a first latitude location of the user or endpoint terminal, the user or automated system may select a first tilt angle to adjust the field of regard from a non-tilted field or regard to a first tilted field of regard for a first tilted antenna aperture. Based on a second latitude location of the user or endpoint terminal, the user or automated system may select a second tilt angle to adjust the field of regard from non-tilted field of regard to a second tilted field of regard for a second tilted antenna aperture, and so on.

After the tilt angle is selected, the user or an automated system may tilt the user or endpoint terminal to the appropriate tilt angle. Such tilt reduces the interference of the field of regard with the GEO-belt interference zone and increases the number of satellites visible within that field of regard (as seen in FIG. 2C).

Referring to FIG. 8, a series of adjacently located homes in the Earth's northern hemisphere, each having an endpoint terminal 102 are illustrated. In the illustrated embodiment of FIG. 8, the northward direction is toward the right of the page. The antenna systems of the user terminals 102 have fields of regard 176 which are shaped in a predetermined fashion (e.g., corresponding to the shape of the aperture of the antenna systems, etc.) resulting from the maximum angle that the user terminal may steer from the boresight vector 178 to the field of regard 176. In addition, the antenna systems of the user terminals 102 are oriented to have a boresight vector substantially vertical (or substantially perpendicular to a tangent to the Earth's mean surface).

Shown in phantom in FIG. 8, the user terminals 102 can be tilted northward to generate tilted fields of regard each generating a tilted cone-shaped communication zone 186 having a tilted boresight vector and a tilted field of regard 162.

As can be seen in FIG. 8, the tilted fields of regard 162 of at least a subset of user terminals in a given geographical area (or cell) on Earth will communicate with the same satellite for reliability of communication if the users tilt their antenna systems at the same or similar tilt angles. For example, if every user terminal in a geographical cell, such as a 30 km diameter cell, points their antenna system in the same direction at the same tilt angle, the fields of regard of their antenna systems will overlap at a LEO distance, for example, a distance of 500 km from the Earth.

If the users tilt their antenna system in arbitrary different directions, there may not be enough overlap between communication zones to serve all users in a subset or geographical region using the same satellite, and communication reliability may decrease for a given geographical area on Earth.

In some cases, there may be multiple satellites available for communication with a certain geographical cell. In this case, a first subset of user terminals within the geographical cell may tilt at a first tilt angle to communicate with a first satellite, and a second subset of user terminals within the geographical cell may tilt at a second tilt angle to communicate with a second satellite, and so on. There may be additional prescribed tilt angles within the geographical cell depending on the satellite availability within the satellite constellation.

Of note, for tilted communication, the distance the communications signals must travel is longer as compared to direct overhead communication. Even though the travel distance for communication between tilted user terminals and satellites is increased, the advantageous effects tilting away from the GEO-belt and tilting toward the swarm of satellites near the upper and lower limiting latitudes of the satellite string orbital path may provide enhanced communication performance.

Referring to FIG. 9, a method of orienting a user or endpoint terminal at an Earth-based location further includes determining the upper and lower limiting latitudes of an orbital path for a satellite string as defined by the angle of inclination of the satellite string. For example, for an orbital path Y1 in FIG. 2C having an angle of inclination of 53 degrees, a user terminal may be properly orientated to have no tilt at the upper limiting latitude for the orbital path at 53 degrees latitude or at corresponding lower limiting latitude for the orbital path −53 degrees latitude.

In accordance with embodiments of the present disclosure, FIG. 9 illustrates a series of user terminals located at various latitudes and showing adjusted north and south tilt angles based on latitude and the upper limiting latitude of the orbital path for the satellite string. At the equator, the tilt angle is the greatest at 43 degrees northward. As the user terminals are positioned more northward on the Earth's surface, the tilting angle remains in the northward direction by progressively decreases to 35 degree at 15°N, to 27 degrees at 32°N, to 22 degrees at 42°N, then back to 27 degrees at 48N. At 53°N, the user terminal is tilted 10 degrees southward to tilt toward the swarm of satellites at the upper limiting latitude of the orbital path for the satellite string.

Tilting Depending on Geographical Features

In addition to north or south tilting for tilting away from the GEO-belt and tilting to increase the number of visible satellites within the field of regard, the user terminal may also be tilted in north or south and east or west directions for load balancing of satellites in the satellite constellation based on user terminal population density or geographical features. For example, if a certain geographic area does not include a dense set of user terminals, an adjacent geographic area may be able to take advantage of the satellite coverage available in the first geographic area.

As a non-limiting example, if a geographic cell of user terminals is located eastward of a large body of water, such as the Pacific Ocean, some or all of the user terminals in the geographic cell may be tilted westward to take advantage of a second nearby satellite that is further in distance from the user terminal than a first satellite, but the second nearby satellite having reduced communication load. Likewise, a cell of user terminals located westward of the Atlantic Ocean may be tilted eastward to take advantage of a second nearby satellite that is further in distance from the user terminal than a first satellite, but the second nearby satellite having reduced communication load.

Figure 10:
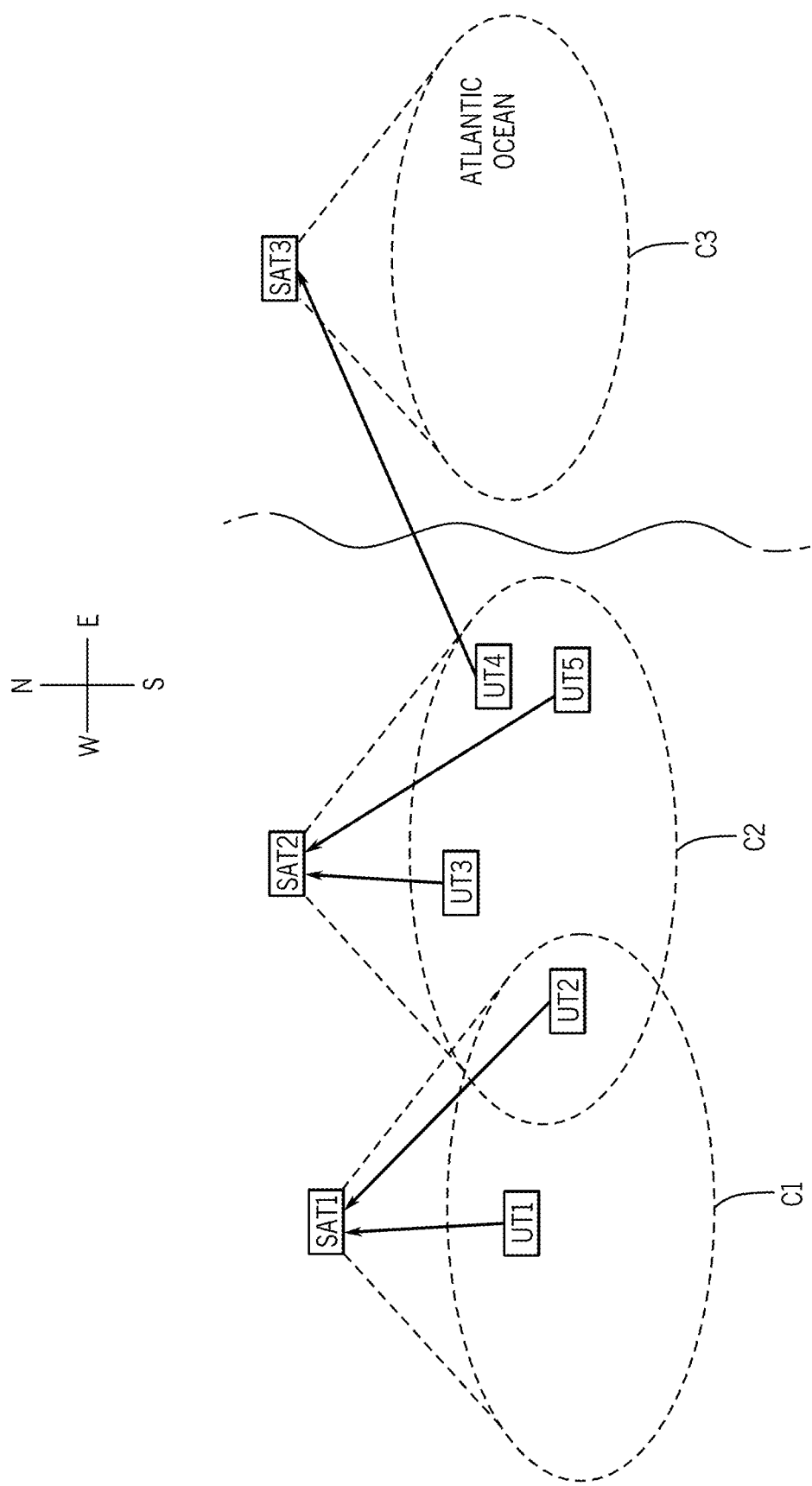
FIG. 10 is a not-to-scale exemplary schematic illustrating satellite communication coverage cells.

Referring to FIG. 10, three satellites SAT1, SAT2, and SAT3 are shown, each defining a geographic coverage cell C1, C2, or C3 for communication coverage. Within each cell are a plurality of user terminals UT1-UT5. In the illustrated embodiment, UT1 and UT2 are configured for communication with SAT1, both being within SAT1's coverage cell C1. However, UT2 is also within SAT2's coverage cell C2 and can be electronically steered to communicate with either satellite SAT1 or SAT2. In SAT2's coverage cell are three other user terminals UT3, UT4, and UT5. For load balancing, UT4 and/or UT5 may be tilted eastward to communicate with SAT3, which is currently located over the Atlantic Ocean and has no user terminals within its coverage cell C3.

As discussed above, for tilted communication, the distance the communications signals must travel is longer as compared to direct overhead communication. Even though the travel distance for communication between UT4 or UT5 and SAT3 as compared to the travel distance for communication to SAT2 is increased, the advantageous effects of load balancing may provide enhanced communication performance.

In another non-limiting example, geographic area may not be a body of water, but may be sparsely inhabited, or may be a country that does not subscribe to the service provided by the satellite constellation.

The tilting configuration for a cell of user terminals or a portion of the cell of user terminal may include a combination of north or south and east or west tilting. In addition the factors discussed above, other factors that may affect tilt angle of a user terminal include the latitude location for the endpoint terminal, a longitude location of the endpoint terminal, obstructions, geological features, population density, an altitude of the end point terminal, a load balancing analysis of the satellite constellation, one or more angles of inclination of the satellite constellation, a geographical cell to which the end point terminal belongs, and combinations thereof.

Selecting Location for User Terminal Based on Geographical Features

Figure 11A:
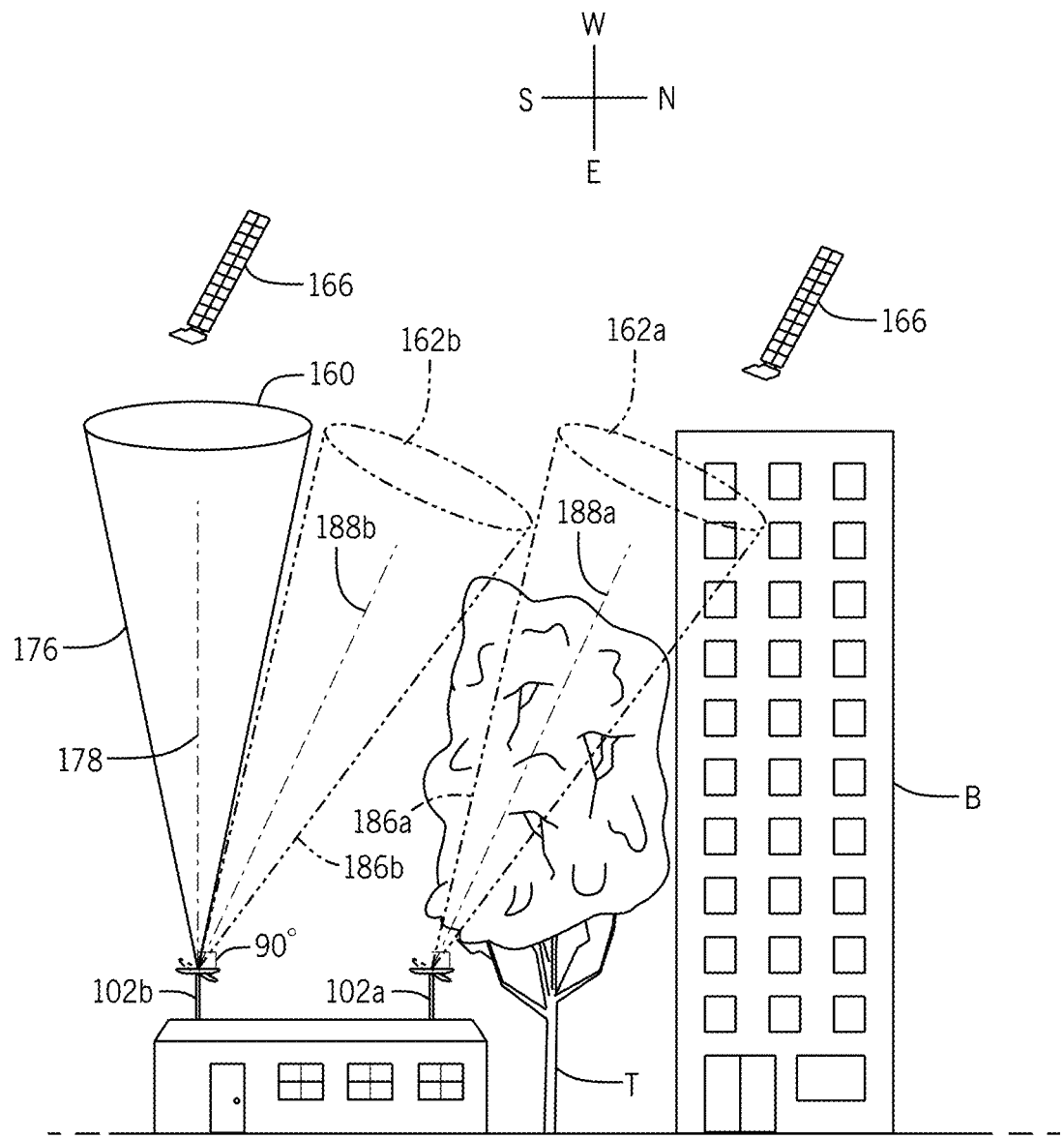

Referring to FIGS. 11A-11C, a method of configuring a user terminal at an Earth-based location may also include an assessment the landscape surrounding the endpoint terminal 102, such as trees, buildings, and other obstructions that might affect the communication between a given user terminal and the constellation of satellites 166 with which it is communicating. In the illustrated embodiment of FIGS. 11A-11C, the northward direction is toward the right of the page.

Therefore, a method of configuring an endpoint terminal 102 may include assessing interfering obstructions close to one or more tilted communication zones of the endpoint terminal 102, and determining if an endpoint terminal 102 can, in fact, be located in a specific location, or if a new location needs to be determined for that endpoint terminal 102. Such obstructions may be determined by land owner surveys or by Global Navigation Satellite System (GNSS) and geospatial data. In addition, such obstructions may be determined by analyzing image data corresponding to a field of regard of the endpoint terminal 102. For example, obstructions may be determined using computer vision techniques, object recognition techniques, among other techniques.

Figure 12:
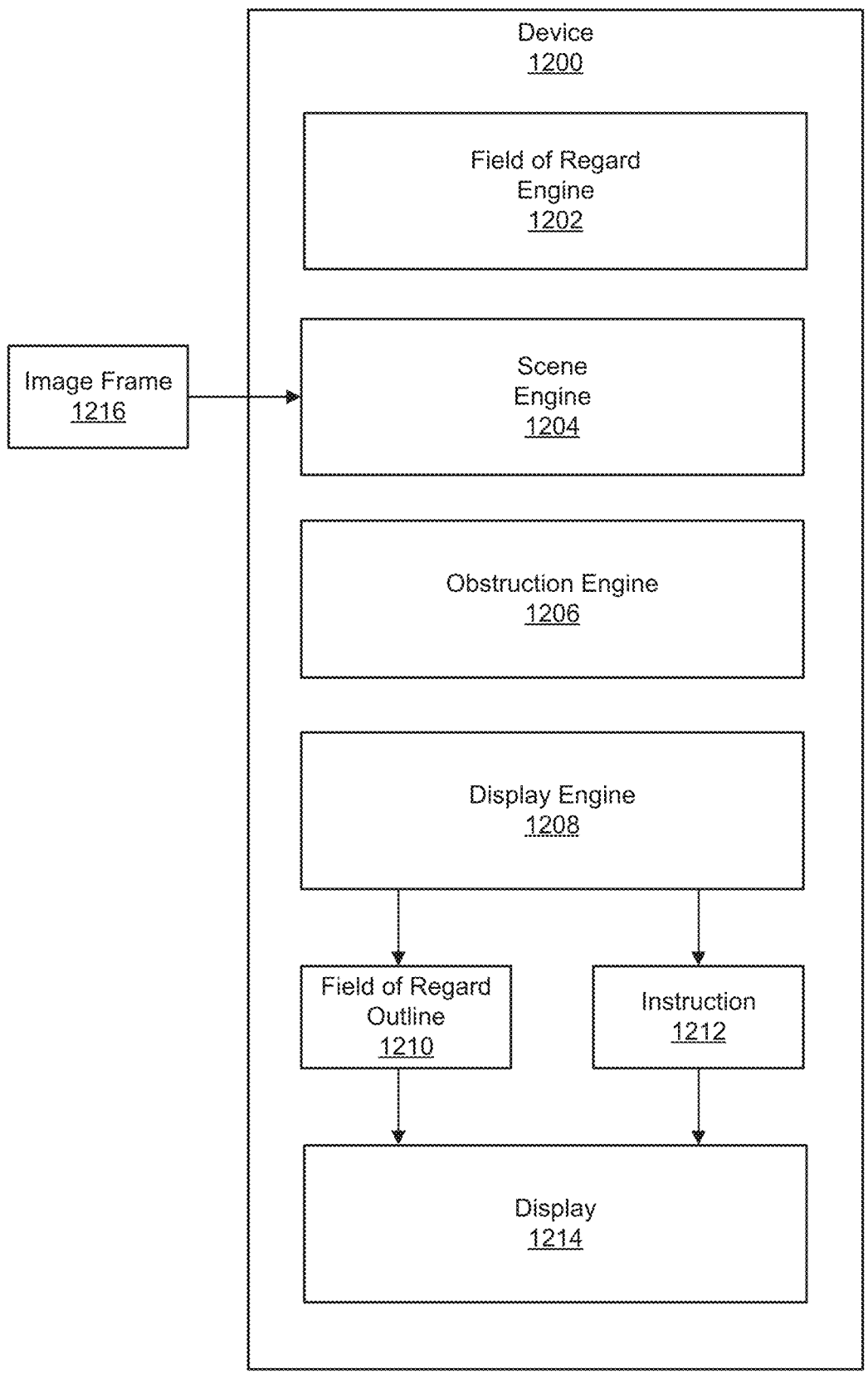
FIG. 12 is an exemplary block diagram illustrating components of device for facilitating satellite visibility for Earth-based antenna systems.

Referring to FIG. 12, a block diagram of an example device 1200 that facilitates configuring the endpoint terminal 102 for communication with a satellite constellation is provided. In a non-limiting example, the device 1200 may correspond to a mobile device (e.g., a smart phone, a tablet, a laptop, etc.). The mobile device may be owned and/or operated by a user who wishes to configure the endpoint terminal 102. In another non-limiting example, the device 1200 may be part of and/or implemented by the endpoint terminal 102. As shown, the device 1200 may include one or more engines, including a field of regard engine 1202, a scene engine 1204, an obstruction engine 1206, and a display engine 1208. In a non-limiting example, the engines of the device 1200 may be part of and/or implemented by an application running on the device 1200. For instance, a user of the device 1200 may download and install the application on the device 1200 in order to facilitate configuring the endpoint terminal 102 for communication with a satellite constellation. In a non-limiting example, the application may be referred to as a "field of view checker" or a "field of regard checker." As shown, device 1200 may also include a display 1214 that displays graphics and/or images (e.g., for viewing by a user of the device 1200). The device 1200 may include one or more additional components not illustrated in FIG. 12, such as an accelerometer, a gyroscope, a magnetometer, an inertial measurement unit (IMU), a camera device, an image sensor, a radar sensor, a light detection and ranging (LIDAR) sensor, a Global Positioning System (GPS), a graphics processing unit (GPU) 114, a digital signal processor (DSP), an image signal processor (ISP), among other components.

In one example, the field of regard engine 1202 may determine a field of regard of the endpoint terminal 102 corresponding to the location of the device 1200. For instance, if the endpoint terminal 102 has been installed at a location, the field of regard engine 1202 may determine the field of regard of the endpoint terminal 102 while the device 1200 is located nearby (e.g., within several feet, within several inches, etc.) of the endpoint terminal 102. Reducing or minimizing the distance between the device 1200 and the endpoint terminal 102 may result in a more accurate determination of the field of regard (and therefore a more accurate determination of obstructions within the field of regard). In another example, if the endpoint terminal 102 has not yet been installed at a location, the field of regard engine 1202 may determine the field of regard available to the endpoint terminal 102 as if the endpoint terminal 102 is located at the current location of the device 1200 (regardless of whether the endpoint terminal 102 is actually located at the current location of the device 1200). For example, the field of regard engine 1202 can evaluate a potential (rather than actual or current) field of regard of the endpoint terminal 102.

Figure 13:
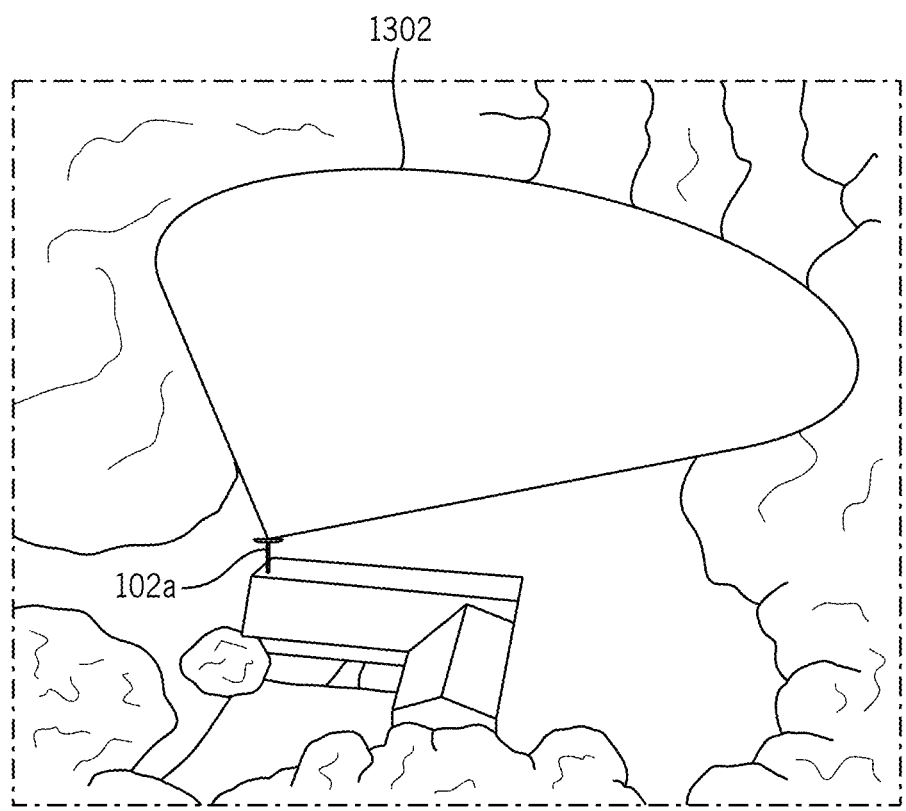
FIG. 13 is an exemplary illustration of a communication zone of an Earth-based antenna system.

Referring to FIG. 13, an example field of regard 1302 determined by the field of regard engine 1202 is provided. In this example, the field of regard 1302 is illustrated as a cone whose apex corresponds to the current location of the device 1200. The field of regard 1302 may extend from the current location of the device 1200 towards a predetermined direction. In non-limiting examples where the device 1200 is located in the Northern hemisphere, the field of regard 1302 may extend towards true North. In non-limiting examples where the device 1200 is located in the Southern hemisphere, the field of regard 1302 may extend towards true South. In some cases, the cone may be of a predetermined width (e.g., angle). In a non-limiting example, the width of the cone may be 50 degrees. In another non-limiting example, the width of the cone may be 60 degrees. In some cases, the field of regard 1302 may be tilted at an angle corresponding to the tilt of the endpoint terminal 102. In one non-limiting example, the tilt of an antenna system of the endpoint terminal 102 may be selected based on factors such as the geographic coordinates of the endpoint terminal 102. In another non-limiting example, the tilt of an antenna system of the endpoint terminal 102 may be selected based on factors such as the latitude of the endpoint terminal 102. Based on the geographic coordinates and/or the latitude of the endpoint terminal 102 (e.g., obtained using a GPS or other positioning system), the field of regard engine 1202 may determine an appropriate tilt angle for the field of regard 1302. In one example, the field of regard engine 1202 may determine the appropriate tilt angle for the field of regard 1302 using a look-up table that maps geographic locations (e.g., latitudes) to predetermined tilt angles.

It should be noted that while the field of regard 1302 can be defined as a cone whose apex corresponds to the current location of the antenna system of the endpoint terminal 102, the shape of the field of regard 1302 can be modified based on additional and/or alternative factors. For example, in addition to using the tilt of the antenna system of the endpoint terminal 102, the field of regard engine 1202 may apply additional constraints to refine or otherwise modify the shape of the field of regard 1302. The modified field of regard generated by applying these additional and/or alternative factors may be presented to the user by the display engine 1208, as described herein.

In an embodiment, the field of regard engine 1202 may determine a minimum elevation angle for the antenna system of the endpoint terminal 102. The minimum elevation angle may be defined as a limitation on the scan angle of the antenna system of the endpoint terminal 102, whereby the antenna system may be prohibited from performing any scans below the minimum elevation angle towards the horizon. The minimum elevation angle may be defined based on regional, local, country, or other location-based regulation. Thus, based on the geographic coordinates and/or the latitude of the endpoint terminal 102, the field of regard engine 1202 may determine the minimum elevation angle for the antenna system of the endpoint terminal 102. The field of regard engine 1202 may revise or otherwise modify the field of regard 1302 for the antenna system of the endpoint terminal 102 to remove any areas of the original field of regard that the antenna system is prohibited from scanning based on the determined minimum elevation angle. Thus, the modified field of regard may omit the areas from the original field of regard that the antenna system is prohibited from scanning based on the determined minimum elevation angle.

In an embodiment, the field of regard engine 1202 can determine the GEO-belt interference zone to be applied to modify the field of regard 1302 for the antenna system of the endpoint terminal 102. As noted above, the GEO-belt interference zone is a larger range of communication interference based on the performance of an antenna system to avoid interference with the GEO belt. For example, in accordance with embodiments of the present application, the GEO-belt interference zone may be in a range of +/−5 to 30 degrees of the GEO-belt. The GEO-belt interference zone may, thus, differ based on the geographic coordinates and/or the latitude of the endpoint terminal 102. For example, in the embodiment illustrated in FIGS. 4 and 5 of the present application, the GEO-belt interference zone 170 or 270 is defined as +/−18 degrees of the GEO-belt 172. Therefore, the shaded areas 170 and 270 representing the GEO-belt interference zones 170 and 270 in respective FIGS. 4 and 5 are sized to represent the communication interference zone of +/−18 degrees of the GEO-belt 172. The field of regard engine 1202 may use the GEO-belt interference zone at the geographic coordinates and/or latitude of the endpoint terminal 102 to further refine or otherwise modify the field of regard 1302 for the antenna system of the endpoint terminal 102, resulting in a modified field of regard. For example, if a portion of the GEO-belt interference zone overlaps a portion of the original field of regard of the antenna system, the field of regard engine 1202 may revise or otherwise modify the shape of the original field of regard to omit the portion that overlaps with the GEO-belt interference zone, resulting in a modified field of regard. The resulting shape of the modified field of regard may correspond to the shape of the original field of regard minus any portions that overlap with the GEO-belt interference zone.

In an embodiment, the field of regard engine 1202 can further utilize the range of positions for the satellites in the satellite constellation that may be visible to the antenna system of the endpoint terminal 102 to generate a modified field of regard. For instance, the field of regard engine 1202 may utilize the geographic coordinates and/or the latitude of the endpoint terminal 102, as well as the known configuration of the satellite constellation, to determine the actual communication range for the visible satellites of the satellite constellation at the geographic location of the endpoint terminal 102. The resulting communication range, in some instances, may not completely overlap the original field of regard 1302 of the antenna system of the endpoint terminal 102. As such, the field of regard engine 1202 may revise or otherwise modify the shape of the original field of regard 1302 for the antenna system of the endpoint terminal 102 to omit the portion of the original field of regard 1302 that does not overlap with the communication range of the visible satellites of the satellite constellation, as these non-overlapping regions may correspond to regions where satellites of the satellite constellation do not traverse. Thus, the shape of the modified field of regard may correspond to regions of the original field of regard that are associated with the communication range of the visible satellites of the satellite constellation.

In an embodiment, the field of regard engine 1202 can further refine or otherwise modify the shape of the field of regard 1302 to accommodate load balancing requirements for the satellite constellation. As noted above, different endpoint terminals may be electronically steered to communicate with different satellites of a satellite constellation based on load balancing requirements. For example, as illustrated in FIG. 10, an endpoint terminal within two or more satellite coverage cells can be electronically steered to communicate with any of the satellites corresponding to the two or more satellite coverage cells. For load balancing, this endpoint terminal may be electronically steered such that it is tilted to communicate with a particular satellite for load balancing purposes. In an embodiment, the field of regard engine 1202 can determine which satellites of the satellite constellation the endpoint terminal 102 is assigned to communicate with for load balancing purposes and determine the portions of the different satellite coverage cells that overlap with the maximum scan angle of the antenna system of the endpoint terminal 102. The field of regard engine 1202 may use this overlap to modify the shape of the field of regard 1302 for the antenna system of the endpoint terminal 102 to generate a modified field of regard. The shape of the modified field of regard may thus correspond to regions of the original field of regard 1302 that are associated with the satellite coverage cells of the satellites assigned to communicate with the endpoint terminal 102 for load balancing purposes.

In some examples, rather than using an antenna aperture shape whose apex corresponds to the current location and tilt angle of the antenna system of the endpoint terminal 102 as the original field of regard 1302 for the antenna system, the field of regard engine 1202 generates a mask that is mapped on to a hemisphere or other spherical section corresponding to the full sky view to the horizon. The mask may represent a modified field of regard for the antenna system of the endpoint terminal 102. In an embodiment, the field of regard engine 1202 uses the various factors (e.g., tilt angle, scan angle of the antenna system, physical constellation configuration and positioning, regulatory constraints, etc.) to calculate the shape of the mask that is to be mapped onto the hemisphere or other spherical section in place of the original field of regard 1302.

It should be noted that the modified field of regard may represent an enveloping or exemplary shape that provides a general understanding of a zone of communication between the endpoint terminal 102 and the visible satellites of the satellite constellation. For instance, the resulting modified field of regard may omit certain regions in which the visible satellites of the satellite constellation actually transmit as a result of regulatory or other constraints (e.g., minimum elevation angle for the antenna system of the endpoint terminal 102, the GEO-belt interference zone, etc.). In some embodiments, the shape of the modified field of regard may be expanded to incorporate a buffer region to provide additional tolerance in the event that the device 1200 is miscalibrated or other configuration issues, while still providing an encompassing representation of a possible zone of communication between the endpoint terminal 102 and the visible satellites of the satellite constellation.

In some examples, the scene engine 1204 may receive one or more image frames (e.g., an image frame 1216) captured by the device 1200. The image frame 1216 may include image data corresponding to a scene surrounding the device 1200. In particular, the image frame 1216 may include image data corresponding to an upward view of the sky. As such, the image frame 1216 may include at least a portion of the field of regard of the endpoint terminal 102. The scene engine 1204 may determine which portion (if any) of the image frame 1216 overlaps with the field of regard. For example, the scene engine 1204 may determine the attitude (e.g., angle and/or orientation) of the device 1200 when the image frame 1216 was captured. The scene engine 1204 may determine the attitude of the device 1200 using one or more sensors or devices integrated into the device 1200, such as a gyroscope, an accelerometer, and/or a magnetometer. In one example, the scene engine 1204 may access the data obtained by these devices via one or more sensor application program interfaces (APIs) of the device 1200. Based on the attitude of the device 1200, the scene engine 1204 may determine which portion (if any) of the scene corresponding to the image frame 1216 overlaps with the field of regard.

In some cases, the obstruction engine 1206 may determine whether any obstructions are visible and/or present within the portion of the field of regard determined by the scene engine 1204. As described above, an obstruction may include any physical object or neighboring field of regard that might affect the communication between the endpoint terminal 102 and the constellation of satellites with which it is communicating. The obstruction engine 1206 may detect obstructions in various ways. In one example, the obstruction engine 1206 may detect obstructions based on historical data indicating the ability of various Earth-based locations to receive and/or transmit signals to and from the constellation of satellites 166. For example, one or more endpoint terminals, gateways, and/or satellites may periodically (e.g., hourly or daily) assess the strength of signals transmitted between the satellites and the various Earth-based locations. Earth-based locations associated with low signal strengths (e.g., signal strengths below a threshold strength) may correspond to obstructions. Thus, the obstruction engine 1206 may have previous knowledge of the location of obstructions. Based on the current location of the device 1200, the obstruction engine 1206 may determine whether any known obstructions are present and/or visible within the portion of the field of regard included within the image frame 1216. Additionally or alternatively, the obstruction engine 1206 may detect obstructions based on an analysis of the image frame 1216. For example, the obstruction engine 1206 may include and/or be in communication with a computer vision system. The computer vision system may be configured and/or trained to identify various types of obstructions, such as trees, buildings, hills, etc. In a non-limiting example, the computer vision system may be configured and/or trained to detect regions of the image frame 1216 that do not correspond to a clear, unobstructed view of the sky. The computer vision system may enable the obstruction engine 1206 to detect previously unknown obstructions in real-time. In further examples, the obstruction engine 126 may determine obstructions based at least in part on background signal noise within the endpoint terminal 102. For instance, the obstruction engine 126 may measure the amount of noise (e.g., the signal-to-noise ratio) within signals received by the endpoint terminal 102. A high level of noise may indicate an obstruction is at least partially preventing signals from being transmitted between the endpoint terminal 102 and the satellite constellation.

The display engine 1208 may output an indication of the portion of the field of regard included within the image frame 1216. For example, the display engine 1208 may direct the display 1214 to overlay a field of regard outline 1210 on the image frame 1216. Referring to FIG. 14A, an example field of regard outline 1214 is provided. In this example, the display engine 1208 may visually indicate the portion of the field of regard included within the image frame 1216 by darkening portions of the image frame 1216 not included within the field of regard. The display engine 1208 may indicate and/or emphasize the portion of the field of regard included within the image frame 1216 in any suitable manner. In some cases, the field of regard outline 1214 may be implemented as a 3-dimensional (3D) scene rendered on top of a live view of a camera of the device 1200. For example, display engine 1208 may render a 3D scene from the perspective of inside the tip of a cone that corresponds to the field of regard.

In some cases, the display engine 1208 may output an instruction 1212 to the user within the display 1214. For example, the display engine 1208 may generate an instruction 1212 that facilitates finding a suitable location for the endpoint terminal 102. Referring to FIG. 14A, the instruction 1212 may include directing the user to move the device 1200 (e.g., the user's phone). Moving the device 1200 may enable the scene engine 1204 to obtain and analyze image data corresponding to different portions of the field of regard. For instance, as shown in FIG. 14A, the field of regard of the endpoint terminal 102 may be larger than the field of view of the device 1200. Thus, the image frame 1216 may not include the entirety of the field of regard of the endpoint terminal 102. The display engine 1208 may direct the user to move the device 1200 to facilitate detecting obstructions within the entirety of the field of regard. As the device 1200 moves, the display engine 1208 may update the field of regard outline 1210 to account for changes in the scene currently visible within the field of view of the device 1200. For example, the field of regard is stationary, but the scene visible within the field of view of the device 1200 may change. As such, the display engine 1208 may synchronize moving and/or adjusting the field of regard outline 1210 with movement of the device 1200. In a non-limiting example, the display engine 1208 can update the field of regard outline 1210 in response to each image frame captured by the device 1200. In another non-limiting example, the display engine 1208 can update the field of regard outline 1210 after a predetermined number of image frames (e.g., five image frames) are captured, or in response to detecting at least a threshold amount of movement between consecutive frames.

Figure 14C:
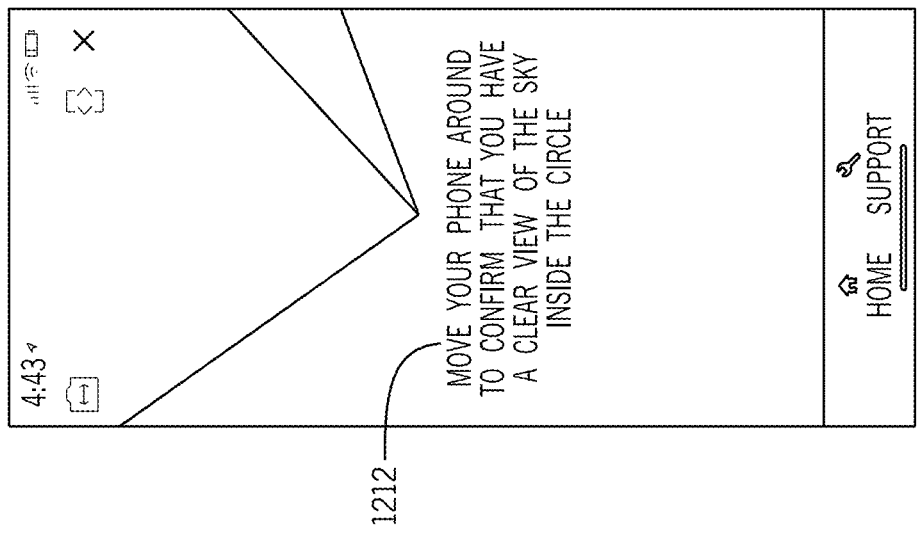
FIGS. 14A, 14B, and 14C are exemplary illustrations of fields of regard and user instructions displayed on a device for facilitating satellite visibility for Earth-based antenna systems.
Figure 14B:
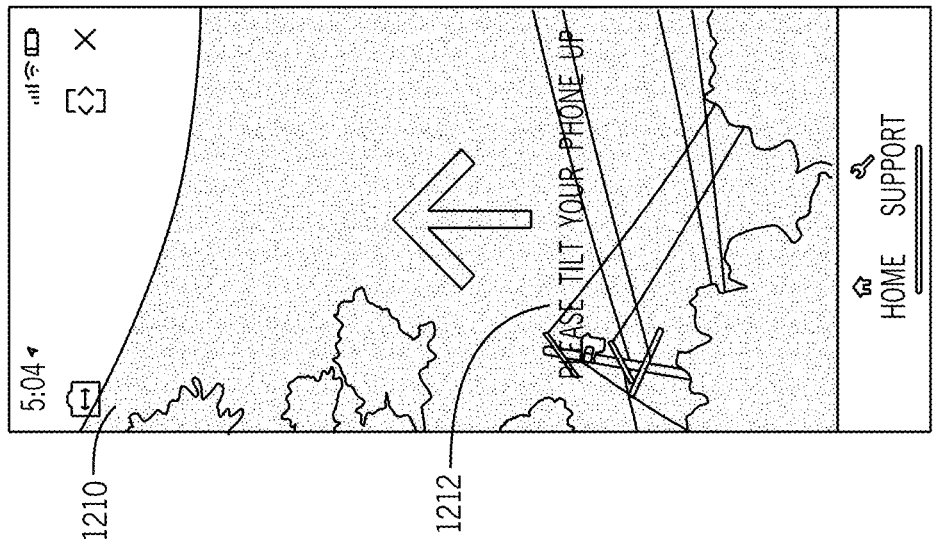
Figure 14A:
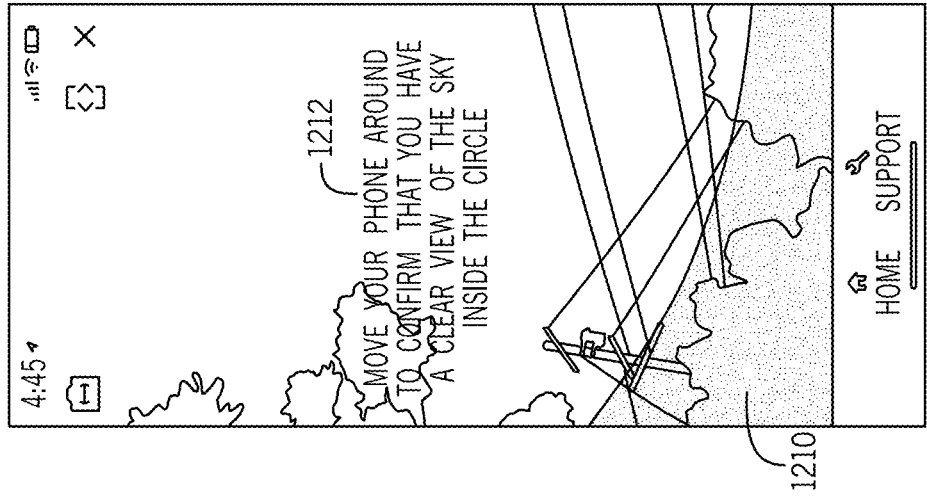

FIGS. 14B and 14C provide additional examples of the field of regard outline 1210 and/or the instruction 1212. In particular, FIG. 14B illustrates an image frame 1216 that includes a relatively small portion of the field of regard. In this example, the display engine 1208 may display an instruction 1212 that directs the user to tilt the device 1200 upwards in order to capture a larger portion of the field or regard. Referring to FIG. 14C, an additional instruction 1212 directing the user to move the device 1200 is provided. FIG. 14C also illustrates a graphical rendering of an example field of regard.

In some examples, the display engine 1208 may visually indicate any obstructions that are visible within the field of regard. For instance, the display engine 1208 may highlight, outline, or otherwise indicate the trees and/or the telephone pole shown in FIG. 14A. Further, the display engine 1208 may display one or more satellites and/or orbital paths within the display 1214. Displaying satellites and/or orbital paths within the display 1214 may indicate and/or emphasize the importance of selecting a location that provides an unobstructed field of regard for the endpoint terminal. The display engine 1208 may display simulated satellites, or the actual trajectories of satellites within the constellation of satellites 166.

The field of regard for an antenna system of a user terminal 102 can be represented using a mask mapped onto a hemisphere or other spherical section representing the full sky view to the horizon. The mask may be shaped based on one or more factors (e.g., tilt angle of the antenna system, scan angle of the antenna system, physical constellation configuration and positioning, regulatory constraints, etc.). Thus, rather than a field of regard corresponding to the aperture of the antenna system, as illustrated in FIGS. 13 and 14A-14C, a modified field of regard for the antenna system of the endpoint terminal 102 may be generated using a mask mapped onto the hemisphere or other spherical section representing the full sky view to the horizon and having a shape defined by the field of regard engine 1202 based on the various factors selected for defining the field of regard for the antenna system.

As noted above, the scene engine 1204 may receive one or more image frames (e.g., an image frame 1216) captured by the device 1200, whereby the image frame 1216 may include image data corresponding to a scene surrounding the device 1200. The image frame 1216 may thus include at least a portion of the modified field of regard of the endpoint terminal 102. The scene engine 1204 may determine which portion (if any) of the image frame 1216 overlaps with the mask mapped onto the hemisphere or other spherical section representing the full sky view and representing the modified field of regard for the antenna system of the endpoint terminal 102.

In an embodiment, the obstruction engine 1206 may determine whether any obstructions are visible and/or present within the portion of the modified field of regard determined by the scene engine 1204. The obstruction engine 1206 may detect obstructions according to the methods described above. For instance, the obstruction engine 1206 may detect obstructions based on historical data indicating the ability of various Earth-based locations to receive and/or transmit signals to and from the constellation of satellites 166. Thus, the obstruction engine 1206 may have previous knowledge of the location of obstructions. Based on the current location of the device 1200 and the modified field of regard, the obstruction engine 1206 may determine whether any known obstructions are present and/or visible within the portion of the modified field of regard included within the image frame 1216.

In an embodiment, the field of regard engine 1202 can utilize obstructions as an additional factor in determining a modified field of regard for the antenna system of the endpoint terminal 102. For instance, the field of regard engine 1202 may utilize historical data indicating the ability of various Earth-based locations to receive and/or transmit signals to and from the constellation of satellites 166 to identify any known obstructions that may interfere or otherwise prevent signals from being transmitted between the user terminal and the satellite constellation. In some instances, based on the geographic coordinates and/or the latitude of the endpoint terminal 102 (e.g., obtained using a GPS or other positioning system) and historical data, the field of regard engine 1202 may identify any known obstructions within the vicinity of the endpoint terminal 102. These known obstructions may be applied to the original field of regard for the antenna system of the endpoint terminal 102, whereby the field of regard engine 1202 may revise or otherwise modify the original field of regard to remove any areas of the original field of regard corresponding to these known obstructions. Thus, the modified field of regard may omit the areas from the original field of regard that include known obstructions that at least partially prevent signals from being transmitted between the endpoint terminal 102 and the satellite constellation.

Referring to FIGS. 15A-15C, an example modified field of regard outline 1502 corresponding to a field of regard mapped onto a hemisphere or other spherical section representing the full sky view is provided. In this example, the modified field of regard outline 1502 may have a different shape compared to that of the field of regard outline 1210 illustrated in FIGS. 14A-14C. The modified field of regard outline 1502 illustrated in FIGS. 15A-15C may be generated by the field of regard engine 1202 based on one or more factors selected for definition of the field of regard for an antenna system of the endpoint terminal 102. To generate the modified field of regard 1502 for the antenna system of the endpoint terminal 102, the field of regard engine 1202 may initially define the hemisphere or other spherical section representing the full sky view. For instance, based on the geographic coordinates and/or the latitude of the endpoint terminal 102 (e.g., obtained using a GPS or other positioning system), the field of regard engine 1202 may determine the coordinate and/or latitudinal range of the hemisphere or other spherical section from which the field of regard is to be derived. Additionally, based on the geographic coordinates and/or the latitude of the endpoint terminal 102 (e.g., obtained using a GPS or other positioning system), the field of regard engine 1202 may determine an appropriate tilt angle for the field of regard. In one example, the field of regard engine 1202 may determine the appropriate tilt angle for the field of regard using a look-up table that maps geographic locations (e.g., latitudes) to predetermined tilt angles.

The field of regard engine 1202 may further apply one or more other factors or constraints to the initial or original field of regard to further modify the shape of the field of regard for the antenna system of the endpoint terminal 102, resulting in a modified field of regard 1502. As noted above, the field of regard engine 1202 may apply a minimum elevation angle for the antenna system of the endpoint terminal 102, the GEO-belt interference zone, the actual communication range of satellites in the satellite constellation that traverse a portion of the hemispherical or sectional region of the sky corresponding to the geographic and/or latitudinal location of the antenna system of the endpoint terminal 102, load balancing requirements, and the like to refine the shape of the field of regard. The resulting shape of the field of regard may be applied as a mask to the hemisphere or other spherical section representing the full sky view.

The field of regard engine 1202 may provide data corresponding to shape and position of the modified field of regard relative to the hemisphere or other spherical section representing the full sky view at the geographic and/or latitudinal location of the antenna system to the display engine 1208. This may cause the display engine 1208 to direct the display 1214 to overlay an outline corresponding to the shape of the modified field of regard on to an image frame. For instance, as the user moves the device 1200, the display 1214 may be updated to graphically represent a portion of the modified field of regard in accordance with the orientation and location of the device 1200. As illustrated in FIGS. 15A-C, the resulting shape of the field of regard may differ from the field of regard represented in FIGS. 14A-C, as the resulting shape may be determined based on the aforementioned factors. Additionally, the shape of the field of regard may be dynamically updated in real-time based on any obstructions detected by the obstruction engine 1206 based on one or more image frames (e.g., an image frame 1216) captured by the device 1200, as noted above.

Referring to FIG. 15A, an example modified field of regard outline 1502 is provided. In this example, the display engine 1208 may visually indicate the portion of the modified field of regard included within the image frame 1216 by darkening portions of the image frame 1216 not included within the field of regard. The display engine 1208 may indicate and/or emphasize the portion of the modified field of regard included within the image frame 1216 in any suitable manner. In some cases, the modified field of regard outline 1502 may be implemented as a 3D scene rendered on top of a live view of a camera of the device 1200.

Similar to the examples described above in connection with FIGS. 14A-14C, the display engine 1208 may output an instruction 1212 to the user within the display 1214. For example, the display engine 1208 may generate an instruction 1212 that facilitates finding a suitable location for the endpoint terminal 102. Referring to FIG. 15A, the instruction 1212 may include directing the user to install the endpoint terminal 102 in a location corresponding to the modified field of regard. Moving the device 1200 may enable the scene engine 1204 to obtain and analyze image data corresponding to different portions of the modified field of regard. For instance, as shown in FIG. 15A, the modified field of regard of the endpoint terminal 102 may be larger than the field of view of the device 1200. Thus, the image frame 1216 may not include the entirety of the modified field of regard of the endpoint terminal 102. As the device 1200 moves, the display engine 1208 may update the modified field of regard outline 1502 to account for changes in the scene currently visible within the field of view of the device 1200. As such, the display engine 1208 may synchronize moving and/or adjusting the modified field of regard outline 1502 with movement of the device 1200.

FIGS. 15B and 15C provide additional examples of the modified field of regard outline 1502 and/or the instruction 1212. In particular, FIG. 15B illustrates an image frame 1216 that includes a different portion of the modified field of regard. Referring to FIG. 15C also illustrates a graphical rendering of an example modified field of regard with a corresponding instruction 1212 for installing the endpoint terminal 102.

As noted above, the modified field of regard may represent an enveloping or exemplary shape that provides a general understanding of a zone of communication between the endpoint terminal 102 and the visible satellites of the satellite constellation. Thus, the modified field of regard outline 1502 that may be presented via the image frame 1216 of the device 1200 may provide this enveloping or exemplary shape corresponding to the modified field of regard. The modified field of regard outline 1502 may omit regions of in which the visible satellites of the satellite constellation may actually transmit. These regions may be omitted as a result of regulatory or other constraints (e.g., minimum elevation angle for the antenna system of the endpoint terminal 102, the GEO-belt interference zone, etc.). In some embodiments, the modified field of regard outline 1502 may incorporate one or more buffer regions to provide additional tolerance in the event that the device 1200 is miscalibrated or as a result of other configuration issues that may introduce inaccuracies in the determination of a definitive field of regard. This may provide for an encompassing representation of a possible zone of communication between the endpoint terminal 102 and the visible satellites of the satellite constellation.

Referring to FIGS. 11A-11C, examples of evaluating the level of communication facilitated by various locations of the endpoint terminal 102 are provided. The level of communication between an endpoint terminal 102 and the constellation of satellites 166 may include a zone corresponding to the field of regard of the endpoint terminal 102 and/or the level of intensity of signals between the endpoint terminal 102 and the constellation of satellites 166 subject to the presence of any obstructions. In particular, FIG. 11A illustrates a potential location 1 of the endpoint terminal 102 and a corresponding communication zone 186a having a boresight vector (illustrated as the central longitudinal axis 188a of the communication zone 186a) and field of regard 162a. In a non-limiting example, the communication zone 186a may be conically shaped. As shown, the communication zone 186a is tilted (e.g., based on the latitude of the endpoint terminal 102). At location 1, the field of regard 162a includes multiple obstructions. Specifically, as illustrated by the sky-facing view from the communication zone 186a in FIG. 11B, a tree T and a building B are visible within the field of regard 162a. Based on detecting the tree T and/or the building B within the field of regard 162a, the device 1200 may determine that location 1 is unsuitable for installation of the endpoint terminal 102. For example, the device 1200 may determine that the obstructions will prevent a sufficient level of communication between the endpoint terminal 102 and the constellation of satellites 166. Thus, the device 1200 may provide a visual indication and/or output an instruction to the user directing the user to move the device 1200 to a new (e.g., different) location.

FIG. 11A illustrates a potential location 2 of the endpoint terminal 102 and a corresponding communication zone 186b having a boresight vector (illustrated as the central longitudinal axis 188b of the communication zone 186b) and field of regard 162b. In a non-limiting example, the communication zone 186b may be conically shaped. Alternatively, the communication zone 186b may be pyramidal shaped if the antenna aperture is square shaped. Thus, the shape of the communication zone 186b may be determined based on the shape of the antenna aperture. As shown, the communication zone 186b is tilted (e.g., at the same tilt angle as the communication zone 186a). For reference, an un-tilted communication zone 176 having a boresight vector (illustrated as the central longitudinal axis 178 of the communication zone 176) and field of regard 160 are illustrated in FIG. 11A. At location 2, the field of regard 162b includes a relatively small obstruction (e.g., in comparison with the obstructions included within the field of regard 162a). Specifically, as illustrated by the sky-facing view from the communication zone 186b in FIG. 11C, only a portion of the tree T is included within the field of regard 162b. In some examples, the device 1200 may determine that the portion of the tree T included within the field of regard 162b does not substantially prevent communication between the endpoint terminal 102 and the constellation of satellites 166. Thus, the device 1200 may provide a visual indication and/or output an instruction to the user directing the user to install (e.g., secure or mount) the endpoint terminal 102 at location 2.

Figure 16A:
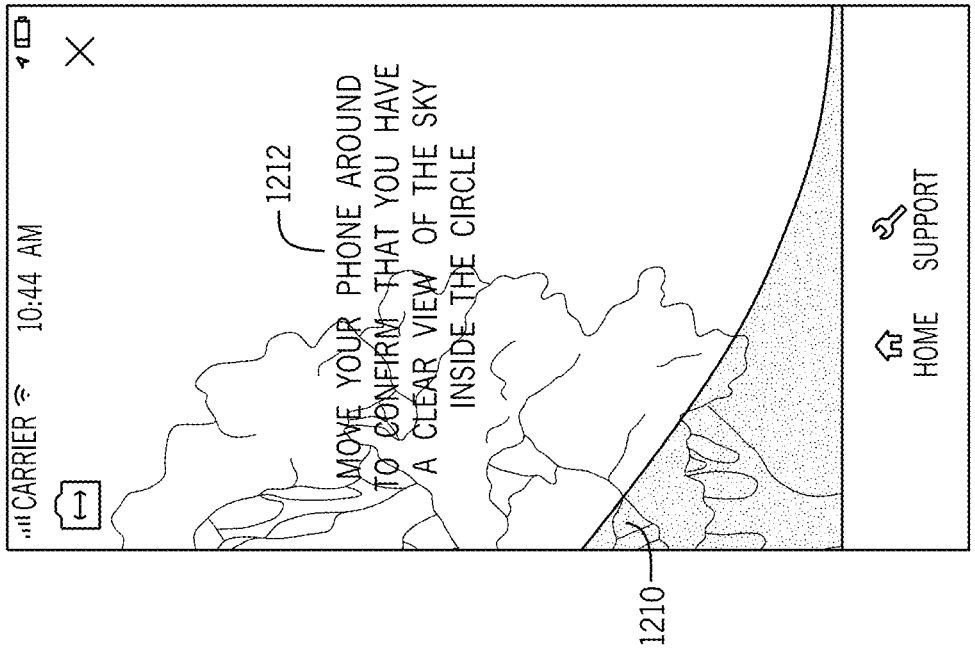
FIGS. 16A and 16B are illustrations of exemplary obstructions visible within a field of regard of an Earth-based antenna system.
Figure 16B:
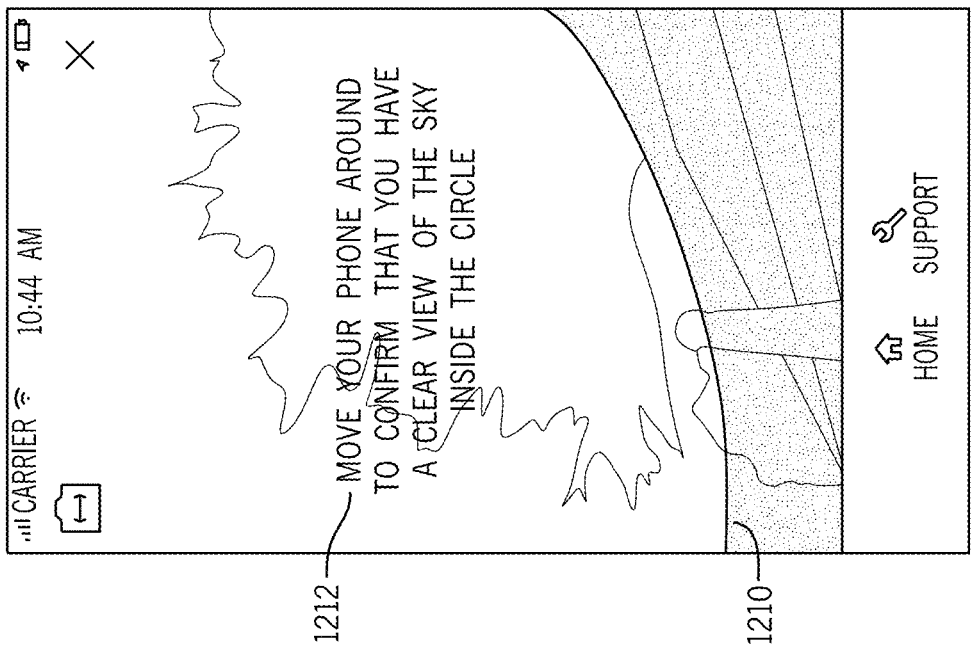

Referring to FIGS. 16A and 16B, additional examples of field of regard outlines and/or user instructions are provided. Specifically, FIGS. 16A and 16B illustrate example obstructions (e.g., trees) visible within a portion of a field of regard. FIGS. 16A and 16B also illustrate instructions directing the user to move their phone in order to obtain image data associated with different portions of the field of regard. In one example, the scene illustrated in FIG. 16A may correspond to a first portion of the field of regard and the scene illustrated in FIG. 16B may correspond to a second portion of the field of regard. Image data for the first and second portions of the field of regard may be obtained by rotating the device 1200 to change the field of view of the device 1200 (while the device 1200 is otherwise stationary). The device 1200 may evaluate the suitability of the location based on obstructions detected in the entirety of the field of regard. For example, the device 1200 may combine analyses of obstructions detected in each portion of the field of regard.

In one example, the device 1200 may compile (e.g., stitch together) image data associated with multiple portions of the field of regard to generate a representation of the entire field of regard. The representation of the entire field of regard may indicate obstructions within one or more portions of the field of regard. In some cases, the device 1200 may store and/or transmit the representation of the entire field of regard. In a non-limiting example, the device 1200 may transmit the representation to a backend server (e.g., a customer support server) for use in detecting or troubleshooting connectivity problems of the endpoint terminal 102. Further, the device 1200 and/or the backend server may continue to update the representation of the entire field of regard in response to detecting new or removed obstructions. For instance, the device 1200 and/or the backend server may, dynamically and in real-time, update the shape of the field of regard to omit regions corresponding to detected obstructions. This may result in a new shape of the field of regard. The device 1200 may update the display 1214 to present a new outline corresponding to the new shape of the field of regard.

Figure 17:
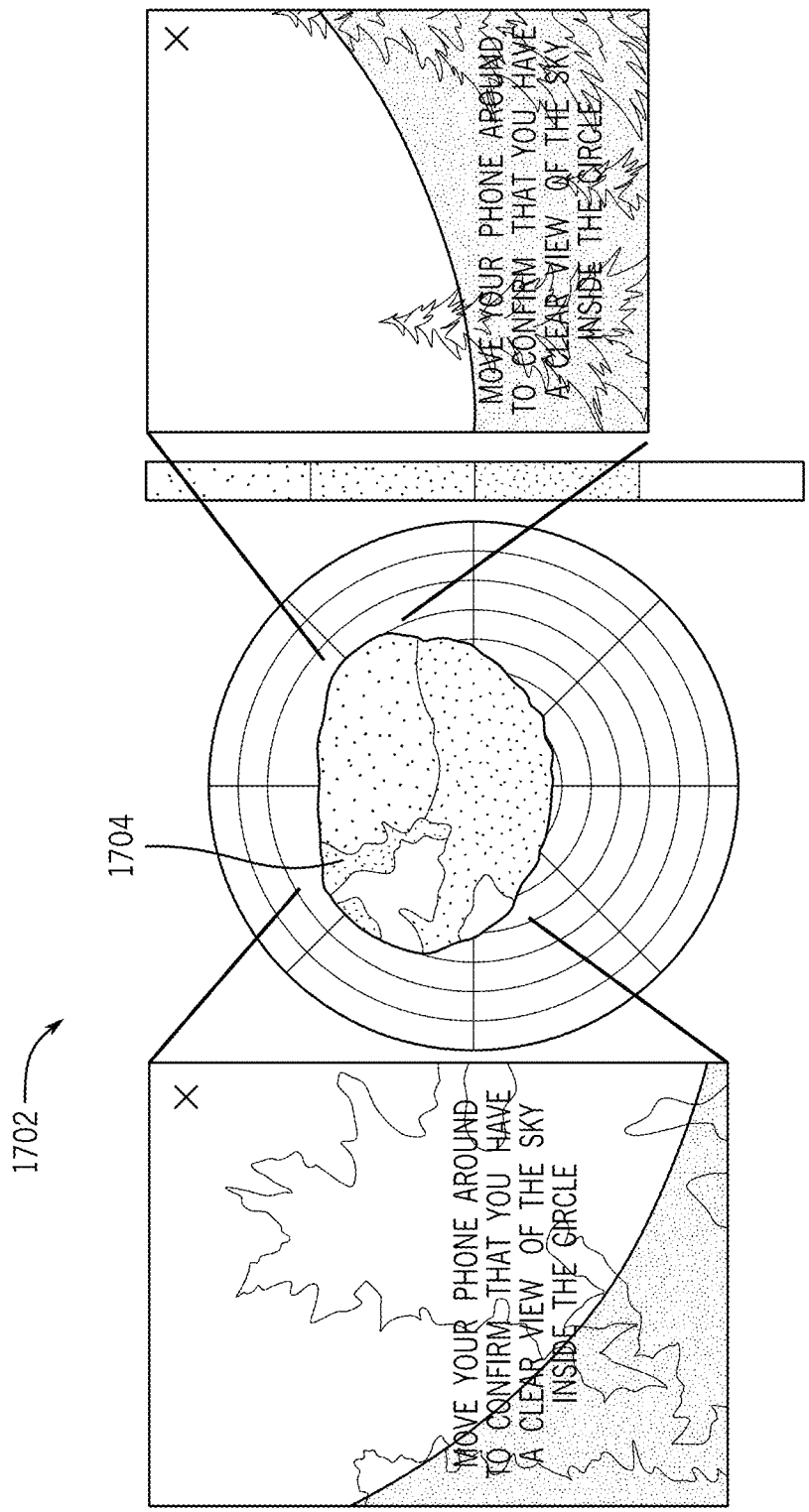
FIG. 17 is an exemplary schematic diagram of a signal-to-noise ratio (SNR) plot.

In some examples, the device 1200 may evaluate the suitability of a location by generating a signal-to-noise ratio (SNR) plot that describes the strength of signals transmitted between an endpoint terminal and a satellite constellation at various points within a field of regard. Referring to FIG. 17, an example SNR plot 1702 is provided. In this example, the areas 1704 of the SNR plot 1702 correspond to points with low signal strength (e.g., due to obstructions). Specifically, the SNR plot 1702 illustrates the impact that various trees may have on the strength of signals transmitted and/or received by the endpoint terminal 102. In some examples, the device 1200 may determine whether the level of communication associated with a field of regard (as indicated by an SNR plot 1702) exceeds a threshold level of communication. A location corresponding to a field of regard whose level of communication exceeds the threshold level may be a suitable location for the endpoint terminal 102, while a location corresponding to a field of regard whose level of communication is below the threshold level may be an unsuitable location.

Figure 18:
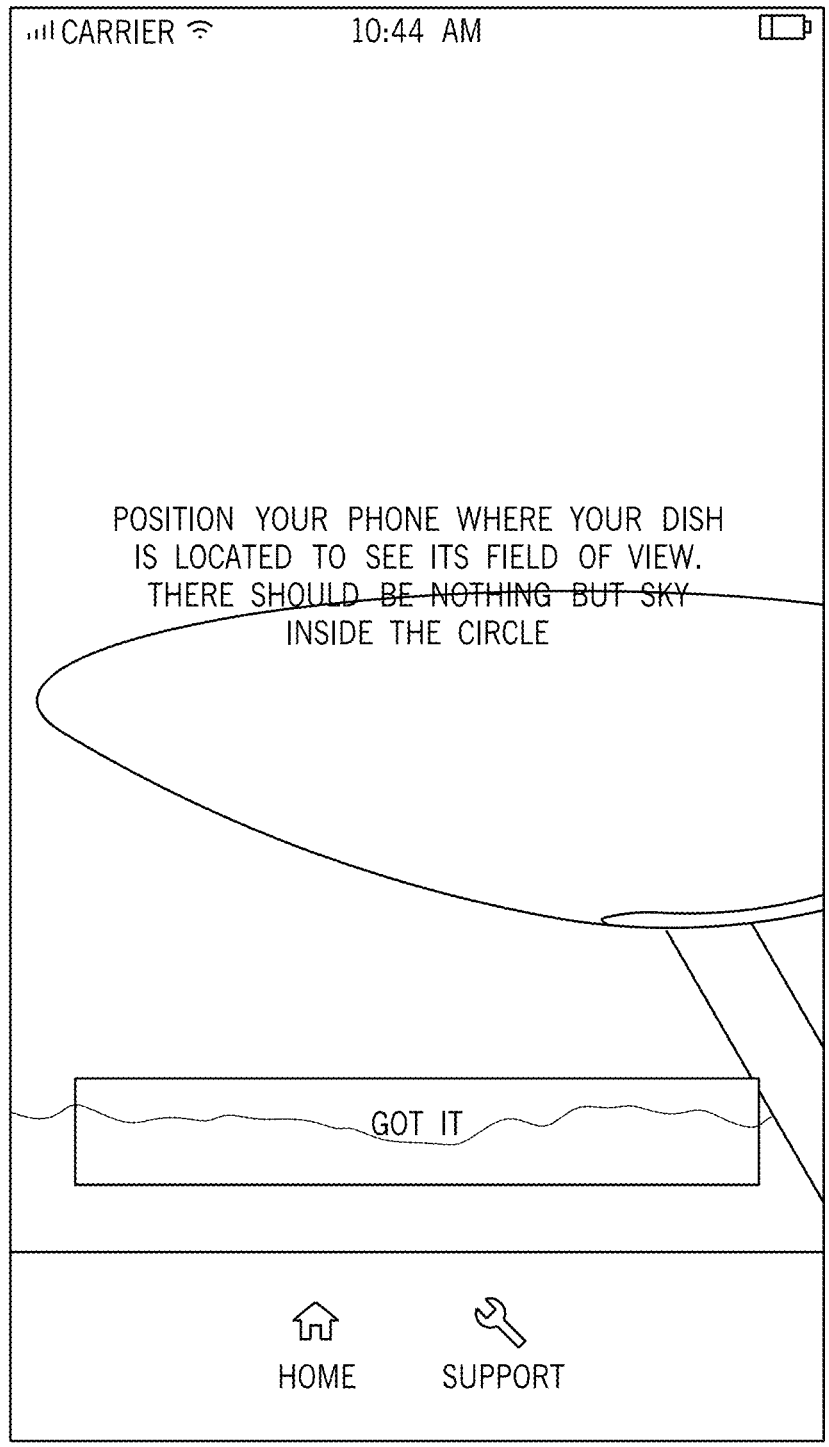
FIG. 18 is an exemplary illustration of an instruction provided to a user to facilitate satellite visibility for an Earth-based antenna system.

The methods for configuring and/or locating endpoint terminals described herein may be implemented in various use-case scenarios. In a first use-case scenario, the endpoint terminal 102 has not been previously installed at a location. In this scenario, an initial suitable location for the endpoint terminal 102 can be determined. Once the suitable location is determined, the endpoint terminal 102 can be installed and/or configured for communication with a constellation of satellites. In a second use-case scenario, the endpoint terminal 102 has been previously installed at a location. In this scenario, it may be determined that an obstruction (a new or existing obstruction) is degrading the quality of communication between the endpoint terminal 102 and a constellation of satellites. For example, the endpoint terminal 102 (or another device, such as a satellite or gateway) may determine that the strength of signals transmitted and/or received by the endpoint terminal 102 has dropped (e.g., below a threshold level). In response, the endpoint terminal 102 may output an indication (e.g., to the device 1200) of the drop in signal strength. If the endpoint terminal 102 (or another device, such as a backend server) detects an obstruction that is likely causing the drop in signal strength, the endpoint terminal 102 may output an indication of the obstruction. Further, the endpoint terminal 102 may direct the user to determine a new (e.g., more suitable) location for the endpoint terminal 102. Referring to FIG. 18, an example of an instruction provided to the user after the endpoint terminal 102 has been installed is provided. In this example, the device 1200 may display an instruction directing the user to position their phone where the endpoint terminal 102 is located in order to detect obstructions (or confirm no obstructions are currently visible within the field of regard of the endpoint terminal 102).

Figure 19C:
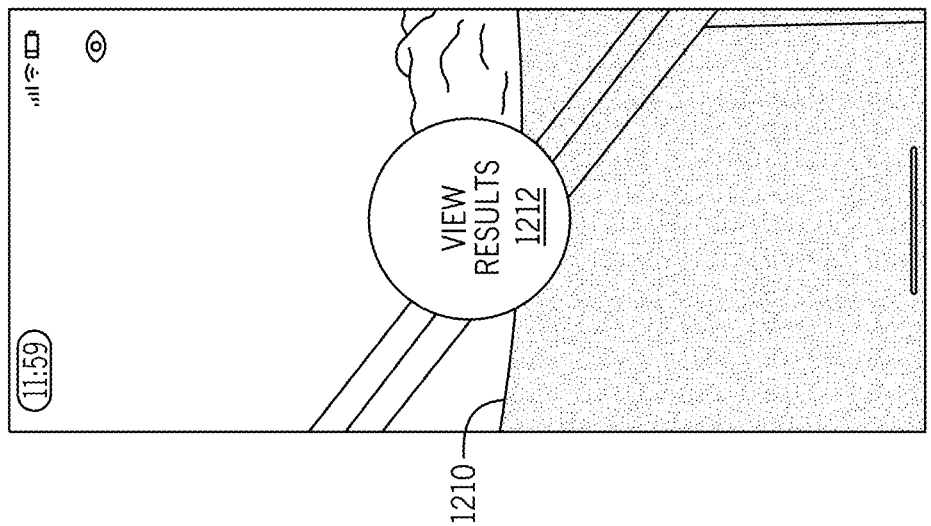
FIGS. 19A, 19B, 19C are exemplary illustrations of fields of regard and user instructions displayed on a device for scanning the field of regard to dynamically identify obstructed and unobstructed regions.
Figure 19B:
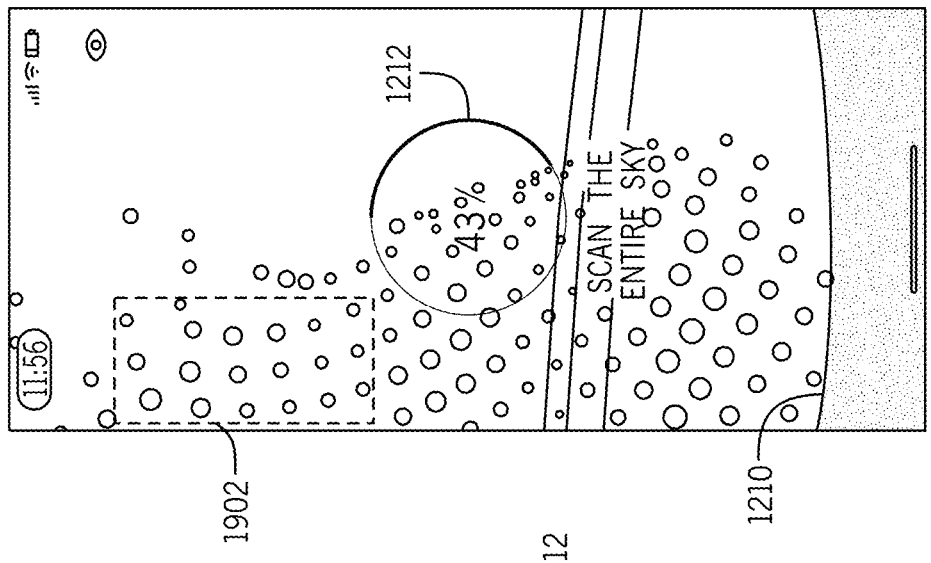
Figure 19A:
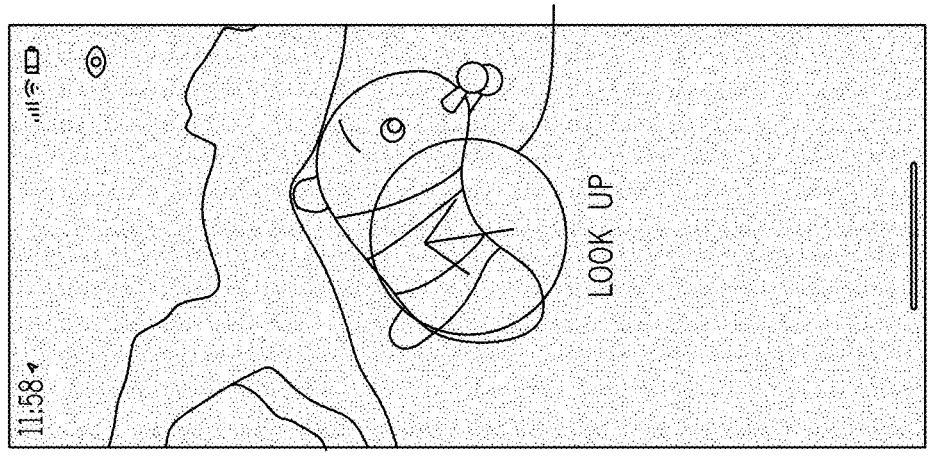

Referring to FIGS. 19A-19C, additional examples of a field of regard and user instructions displayed on a device 1200 for scanning the field of regard to dynamically identify obstructed and unobstructed regions are provided. As noted above, a scene engine 1204 may receive one or more image frames (e.g., an image frame 1216) captured by the device 1200. The scene engine 1204 may determine which portion (if any) of the image frame 1216 overlaps with the field of regard by determining the attitude (e.g., angle and/or orientation) of the device 1200 when the image frame 1216 was captured. Further, the scene engine 1204 may determine the attitude of the device 1200 using one or more sensors or devices integrated into the device 1200, such as a gyroscope, an accelerometer, and/or a magnetometer. In one example, the scene engine 1204 may access the data obtained by these devices via one or more sensor APIs of the device 1200. Based on the attitude of the device 1200, the scene engine 1204 may determine which portion (if any) of the scene corresponding to the image frame 1216 overlaps with the field of regard. Additionally, the display engine 1208 may visually indicate the portion of the field of regard included within the image frame 1216 by darkening portions of the image frame 1216 not included within the field of regard.

As illustrated in FIG. 19A, no portion of the field of regard is included within the image frame captured by the device 1200. Accordingly, the display engine 1208 may darken the entire image frame to visually represent that the device 1200 is positioned away from the field of regard. In an embodiment, the scene engine 1204 may use the attitude of the device 1200, as well as the location of the field of regard, to determine a vector direction for movement of the device 1200 to capture the field of regard. For instance, if the scene engine 1204 determines that no portion of the field of regard is included within the image frame captured by the device 1200, the scene engine 1204 may calculate the shortest vector between the current device attitude and an edge of the field of regard. The scene engine 1204 may provide this shortest vector to the display engine 1208, which may generate an instruction 1212 that directs the user to move the device 1200 towards the field of regard. For example, as illustrated in FIG. 19A, the display engine 1208 may display an instruction 1212 to "Look Up" along with an arrow or other graphical representation of an element that provides the user with a direction in which to move the device 1200.

Moving the device 1200 may enable the scene engine 1204 to obtain and analyze new image data to determine whether the attitude of the device 1200 coincides with any portion of the field of regard. In an embodiment, if the scene engine 1204 determines, based on the new image data, that the attitude of the device 1200 coincides with a portion of the field of regard, the scene engine 1204 may transmit an indication to the display engine 1208 that at least a portion of the field of regard is visible within the image frame 1216. This may cause the display engine 1208 to update the instruction 1212 to indicate that the user may begin using the device 1200 to scan the field of regard. For example, as illustrated in FIG. 19B, the display engine 1208 may update the instruction 1212 to instruct the user to use the device 1200 to scan the entire sky coincident with the field of regard of the endpoint terminal 102. As noted above, as the device 1200 moves within the field of regard, the display engine 1208 may update the field of regard outline 1210 to account for changes in the scene currently visible within the field of view of the device 1200. For example, the field of regard is stationary, but the scene visible within the field of view of the device 1200 may change. As such, the display engine 1208 may synchronize moving and/or adjusting the field of regard outline 1210 with movement of the device 1200.

In an embodiment, the display engine 1208 may dynamically and visually indicate the regions of the field of regard that need to be scanned in order to identify any obstructed and unobstructed regions of the field of regard. For instance, as illustrated in FIG. 19B, the display engine 1208 may generate and display, within the field of regard, a set of dots 1902 indicating regions of the field of regard for which image data is required. Further, the display engine 1208 may update the instruction 1212 to indicate what percentage or amount of the field of regard has been scanned for determining the obstructed and unobstructed regions of the field of regard. For instance, the display engine 1208 may capture, using an image sensor of the device 1200, one or more image frames that include image data that may be processed by the scene engine 1204. The one or more image frames may be captured along with the attitude of the device 1200. In an embodiment, the display engine 1208 may use the captured one or more image frames and the data corresponding to the attitude of the device 1200 when these image frames were captured to determine which regions of the field of regard the captured image frames correspond to. Based on this determination, the display engine 1204 may dynamically, and in real-time, update the display of the device 1200 to indicate the remaining regions of the field of regard that remain to be scanned.

As illustrated in FIG. 19B, as the user utilizes the device 1200 to scan the field of regard, the display engine 1208 may dynamically update the display to remove one or more dots from the regions of the field of regard that have been scanned and for which image data has been obtained. This may provide the user with a real time illustration of any regions of the field of regard that remain to be scanned, thereby instructing the user to move the device 1200 to scan the regions of the field of regard for which a set of dots 1902 are displayed. This, along with the dynamic updates to the instruction 1212 to indicate the percentage or amount of the field of regard that has been scanned, a user of the device 1200 may discern what regions of the field of regard the user needs to scan in order to complete the evaluation of the field of regard.

It should be noted that while dots are used extensively throughout the present disclosure for the purpose of illustration, other methods may be used to denote regions of the field of display that need to be scanned in order to complete the evaluation of the field of regard. For instance, the display engine 1208 may utilize, additionally or alternatively, different colors to denote regions for which image data has been obtained and regions for which image data is still required. As an example, the regions for which image data has been obtained may be denoted using a color with a positive association (e.g., green, blue, etc.) while regions for which image data is still required may be denoted using a color with a negative association (e.g., red, orange, etc.). In some instances, the regions for which image data has been obtained may be devoid of any indicators (e.g., alternative color, dots, etc.) such that the user of the device 1200 may readily determine that these regions have been successfully scanned.

In an embodiment, if the display engine 1208 determines that image data corresponding to the entire field of regard has been obtained, the display engine 1208 may update the instruction 1212 to indicate that scanning of the field of regard has been completed. For example, referring to FIG. 19C, once the user has completed scanning the field of regard and the display engine 1208 determines that corresponding image data has been stored for evaluation, the display engine 1208 may update the instruction 1212 to allow the user to view the results of the scan. Accordingly, the user may select the instruction 1212 displayed on the device 1200 to view the results of its scan of the field of regard. The display engine 1208 may also provide the obtained image data to the scene engine 1204, which may use the image data to identify the obstructed and unobstructed regions of the field of regard.

Figure 20:
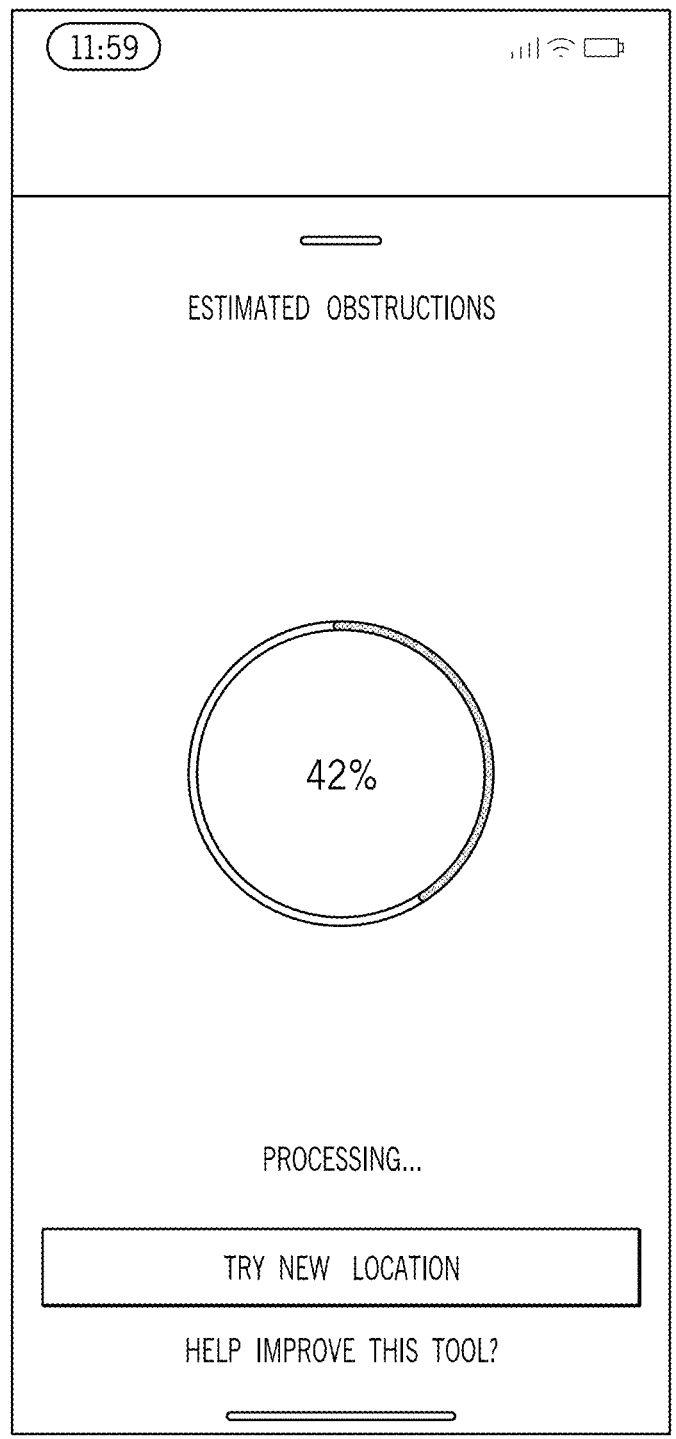
FIG. 20 is an exemplary illustration of a calculation for estimating obstructions within a field of regard displayed on a device used to scan the field of regard.

If the user of the device 1200 selects the instruction 1212, the display engine 1208 may update the display of the device 1200 to provide the user with an indication corresponding to the processing of the image data being performed to estimate the obstructions within the field of regard. Referring to FIG. 20, the display engine 1208 may, in real time, indicate the progress made by the scene engine 1204 in processing the image data obtained from the stored images captured through scanning of the field of regard using the device 1200. For example, as illustrated in FIG. 20, the display engine 1208 may indicate what percentage or amount of the image data has been processed by the scene engine 1204 for determining the estimated obstructions within the field of regard.

In an embodiment, the scene engine 1204 processes the stored images captured through scanning of the field of regard using a machine learning algorithm or artificial intelligence to segment the image data into obstructed and unobstructed regions of the field of regard. For instance, the scene engine 1204 may use a combination of computer vision (e.g., object classification and/or detection) and existing data corresponding to known obstructions at the geographic location of the user terminal 102 to calculate the portions of the field of regard that are obstructed. Additionally, the scene engine 1204 may calculate the length of time and/or how often these portions of the field of regard will remain obstructed.

In an embodiment, the scene engine 1204 uses a convolutional neural network (CNN) to segment the image data into obstructed and unobstructed regions of the field of regard. The CNN may perform binary segmentation of the stored images, whereby for each pixel in a stored image, the CNN may predict whether that pixel represents an obstructed or unobstructed region of the stored image and/or field of regard represented in the stored image. The CNN may be trained using sample images and segmentation masks from open-source and/or proprietary datasets. Further, in some instances, as new image data is obtained from different users for corresponding devices, the scene engine 1204 may store this new image data, along with the classification of regions of the fields of regard corresponding to the new image data, to supplement the datasets used to train the CNN. Prior to training the CNN used to segment the image data into obstructed and unobstructed regions of the field of regard, the CNN weights may be initialized to a set of pre-trained weights obtained from training the CNN using a sample dataset (e.g., open-source or proprietary).

In some instances, as new image data and corresponding classifications are obtained, the datasets used to train the CNN may be changed. For example, as the dataset including the new image data obtained from users and corresponding classifications grows over time, the open-source and/or proprietary datasets used in addition to this dataset may be removed from the training pool. This may reduce the reliance on datasets constructed without using image data corresponding to deployed devices or otherwise from users of these devices.

In an embodiment, the scene engine 1204, in addition to using a CNN to segment the image data into obstructed and unobstructed regions of the field of regard, can use a separate machine learning algorithm or artificial intelligence for semantic classification of the image data. For instance, the separate machine learning algorithm or artificial intelligence may be utilized by the scene engine 1204 to determine where new image data corresponds to images captured indoors or outdoors. This classification of image data may be used to better identify obstructions, instruct users to capture different image data (e.g., instruct a user capturing images indoors to capture additional images outdoors, etc.) that may be used to more accurately identify obstructed and unobstructed regions of the field of regard, and the like.

In an embodiment, the scene engine 1204 may weigh the different regions of the field of regard according to the frequency at which satellites of the satellite constellation pass through these regions. For example, the scene engine 1204 may obtain satellite constellation data corresponding to other users within the geographic region of the user terminal 102 or within other geographic regions for which there may be a similar distribution or frequency in which satellites of the constellation pass through the geographic regions. The scene engine 1204 may use this weighing of the different regions of the field of regard to further refine the segmentation of the image data such that, in addition to identifying obstructed and unobstructed regions of the field of regard, the scene engine 1204 may generate sub-segments corresponding to the frequency in which satellites pass through the unobstructed regions of the field of regard, as well as providing insight into the impact of obstructions within the field of regard to communications to and from the satellites of the satellite constellation.

In an embodiment, as the scene engine 1204 processes the image data obtained via scanning of the field of regard using the device 1200, the scene engine 1204 may provide, in real time to the display engine 1208, a status regarding the processing of the image data. For example, as illustrated in FIG. 20, the display engine 1208 may indicate the amount or percentage of processing performed by the scene engine 1204 to identify the estimated obstructions within the field of regard, as well as any additional data that may be used to determine the estimated performance of the user terminal 102 in communicating with the satellite constellation at its present location.

Figure 21:
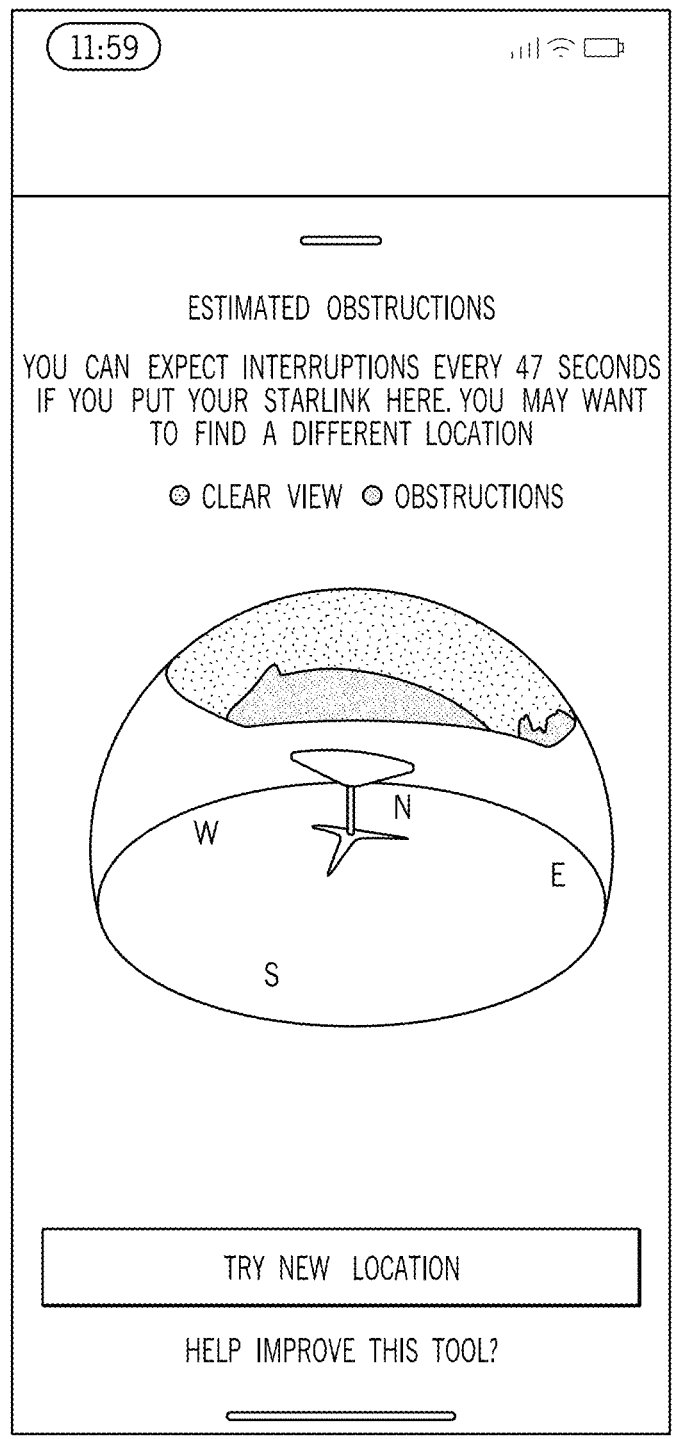
FIG. 21 is an exemplary illustration of estimated obstructions based on a scan of the field of regard, wherein the estimated obstructions are displayed on a device used to scan the field of regard.

Once the scene engine 1204 has completed processing the image data using the machine learning algorithm or artificial intelligence, the scene engine 1204 may provide to the display engine 1208 obstruction data that may be used to generate an obstruction map visualization that illustrates the obstructed and unobstructed regions of the field of regard. Referring to FIG. 21, the display engine 1208 may use the obstruction data to generate the obstruction map visualization, which may be presented to the user via the display of the device 1200. The obstruction data may include coordinates corresponding to different regions of the field of regard that are either obstructed or unobstructed. Accordingly, the display engine 1208 may use the provided coordinates and the obstruction data for these coordinates to create a visualization of the obstruction map for the field of regard.

The obstruction map may provide a visual representation of obstructed and unobstructed regions of the field of regard. For example, as illustrated in FIG. 21, the display engine 1208 may display on the device 1200 a graphical representation of the user terminal 102 and of the field of regard of the user terminal 102. Within the graphical representation of the field of regard, the display engine 1208 may divide the field of regard into obstructed and unobstructed regions based on the obtained obstruction data. The display engine 1208 may further distinguish the obstructed and unobstructed regions using one or more techniques to allow the user of the device 1200 to readily discern between these regions. For example, as illustrated in FIG. 21, the display engine 1208 may use a blue color to graphically denote unobstructed regions of the field of regard and a red color to graphically denote obstructed regions of the field of regard. It should be noted that while different colors are used to distinguish between obstructed and unobstructed regions of the field of regard, other techniques may be used to distinguish between these regions. For example, the display engine 1208 may indicate, via the display, only the unobstructed regions of the field of regard, combining the obstructed regions of the field of regard with other portions of the hemisphere around the user terminal 102 that are not part of the field of regard.

In addition to graphically displaying the obstructed and unobstructed regions of the field of regard, the display engine 1208 may further provide data corresponding to how often and/or for how long portions of the field of regard may be obstructed. For example, as illustrated in FIG. 21, the display engine 1208 may indicate the frequency at which the user terminal 102 may encounter communication interruptions with the satellites of the satellite constellation. This frequency may be determined by the scene engine 1204 based on the calculation of obstructed and unobstructed regions using the provided image data and data corresponding to the frequency at which satellites of the satellite constellation pass through these regions of the field of regard. In an embodiment, based on this data, the scene engine 1204 can generate a recommendation for changing the location of the user terminal 102 to ideally reduce the size of the obstruction regions in the field of regard and, thus, reduce the amount of expected communication interruptions. This recommendation may be provided to the user by the display engine 1208 via the display of the device 1200.

In an embodiment, rather than providing a simulation of the field of regard and of the corresponding obstructed and unobstructed regions (as illustrated in FIG. 21), the display engine 1208 may overlay the obstructed and unobstructed regions of the field of regard on to the image data captured using the device 1200. For example, the display engine 1208 may dynamically overlay the obstructed and unobstructed regions onto the field of regard displayed on the device 1200 such that as the user moves the device 1200, the portions of the obstructed and unobstructed regions corresponding to the portion of the field of regard visible through the device 1200 are presented. This may allow the user to identify, from the image data, the various obstructions that comprise the obstruction regions estimated by the scene engine 1204. Referring to FIGS. 19B-C, the portions of the house within the field of regard may be highlighted to denote that these portions of the house represent an obstruction region of the field of regard. For example, the display engine 1208 may highlight these areas using the same methodology as that illustrated in FIG. 21, whereby the obstruction regions may be represented using the color red. Thus, the user may use the device 1200 to view the obstructed and unobstructed regions of the field of regard through the image data in real time.

In some instances, rather than overlaying the obstructed and unobstructed regions of the field of regard onto the image data in real-time, the display engine 1208 may generate a virtual reality (VR) or panoramic visualization of the captured image data. The display engine 1208 may overlay the obstructed and unobstructed regions of the field of regard onto the VR or panoramic visualization of the captured image data such that the user may discern these regions from the processed image data. This may reduce the processing requirements of the device 1200 in performing real time update of the display to provide the portions of the estimated obstruction map corresponding to the portion of the field of regard corresponding to the present attitude of the device 1200.

In an embodiment, the display engine 1208 can provide the user with an option to add the captured image data to the training dataset that is used to continuously update the CNN and other machine learning algorithms and/or artificial intelligence to identify obstructed and unobstructed regions of different fields of regard and to provide different classifications for obtained image data (e.g., indoor or outdoor images captured, etc.). If the user selects this option, the display engine 1208 may add the captured image data, as well as any classifications generated from the image data (e.g., obstructed and unobstructed regions, indoor or outdoor images, etc.), to the dataset utilized to train the CNN and other machine learning algorithms and/or artificial intelligence. However, if the user opts to not include their image data to the dataset, the display engine 1208 may forego adding this image data to the dataset utilized to train the CNN and other machine learning algorithms.

Methods for Locating a User Terminal

Figure 22:
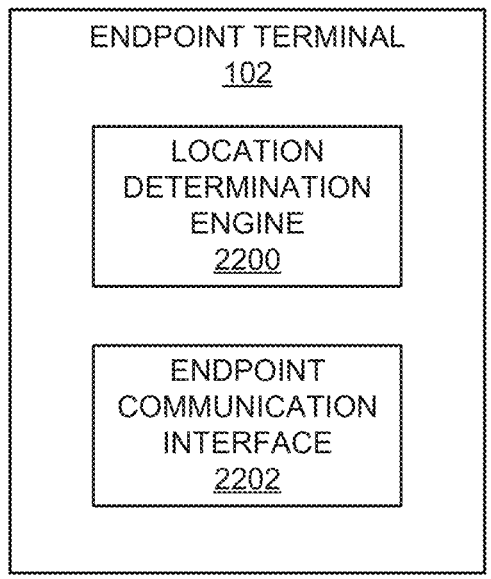
FIG. 22 is a block diagram illustrating components of an endpoint terminal in accordance with embodiments of the present disclosure.

FIG. 22 illustrates components in a block diagram of a non-limiting exemplary embodiment of an endpoint terminal 102 according to various aspects of the present disclosure. In some embodiments, the endpoint terminal 102 is a device that is installed at an end-user premises in order to provide access to the communication network to the end-user premises. As shown, the endpoint terminal 102 includes an endpoint communication interface 2202. The endpoint communication interface 2202 allows the endpoint terminal 102 to communicate with a satellite, such as the first satellite 104 (see FIG. 1). In some embodiments, the endpoint communication interface 2202 may include a phased array antenna configured to communicate with the first satellite 104, for example, via the Ku band. In some embodiments, the endpoint terminal 102 may also include a local communication interface, such as an Ethernet interface, a Wi-Fi interface, or other interface that allows other devices at the endpoint premises to connect to the network via the endpoint terminal 102.

The endpoint terminal 102 further includes an antenna system location determination engine 2200. The location determination engine 2200 may receive information regarding the latitude location for the endpoint terminal, a longitude location of the endpoint terminal, obstructions, geological features, population density, an altitude of the end point terminal, a load balancing analysis of the satellite constellation, one or more angles of inclination of the satellite constellation, a geographical cell to which the end point terminal belongs, and combinations thereof.

Actual embodiments of the illustrated devices will have more components included therein which are known to one of ordinary skill in the art. For example, each of the illustrated devices will have a power source, one or more processors, computer-readable media for storing computer-executable instructions, and so on. These additional components are not illustrated herein for the sake of clarity.

Figure 23:
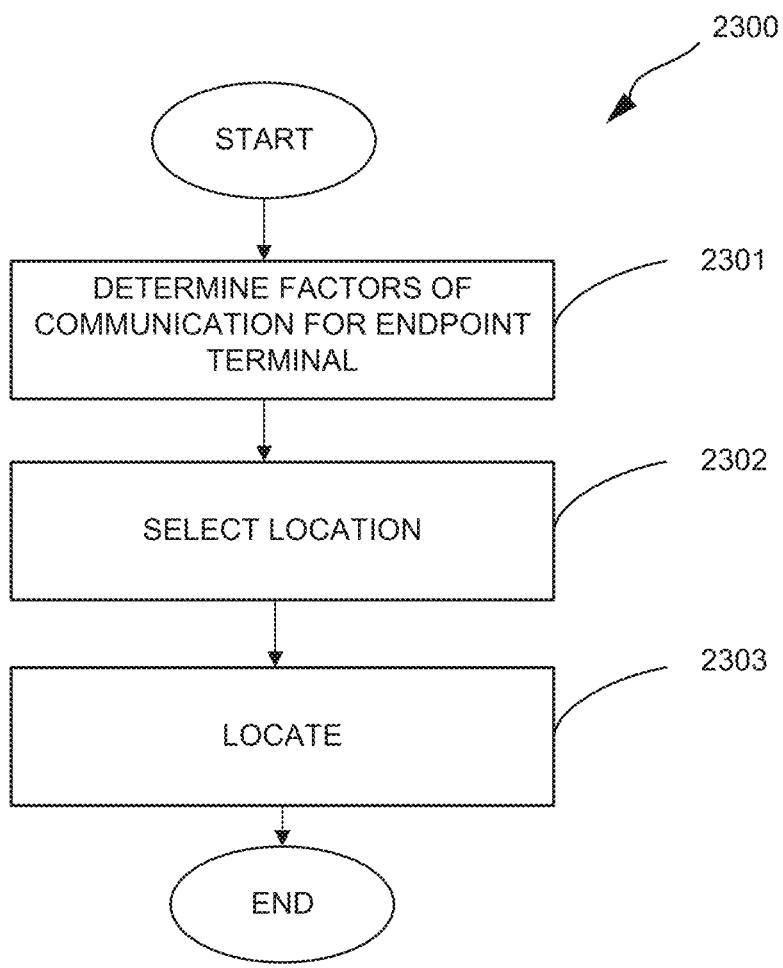
FIG. 23 is a flowchart illustrating a procedure for determining an endpoint terminal location in accordance with embodiments of the present disclosure.

FIG. 23 is a flowchart that illustrates a non-limiting example embodiment of a procedure 2300 for determining a location for a user terminal according to various aspects of the present disclosure. The procedure 2300 is an example of a procedure suitable for use with the endpoint terminal 102 shown in FIG. 22 for configuring an endpoint terminal for communicating with a non-GEO satellite constellation. In some embodiments, the procedure 2300 is executed recursively to adjust for changes in the satellite constellation, satellite communication loads, the endpoint terminal 102, or the endpoint terminal cell.

In block 2301, the procedure includes determining the factors of communication for the endpoint terminal selected from the group consisting of the latitude location for the endpoint terminal, a longitude location of the endpoint terminal, obstructions, geological features, population density, an altitude of the end point terminal, a load balancing analysis of the satellite constellation, one or more angles of inclination of the satellite constellation, a geographical cell to which the end point terminal belongs, and combinations thereof.

In block 2302, based on the factors of communication for the endpoint terminal, selecting a location for the antenna system to adjust the field of regard to avoid obstructions.

In block 2303, installing the endpoint terminal to the selected location.

While illustrative embodiments have been illustrated and described, it will be appreciated that various changes can be made therein without departing from the spirit and scope of the disclosure.

In some examples, the procedures described herein (e.g., procedure 2300 or other procedures described herein) may be performed by a computing device or apparatus, such as a computing device having the computing device architecture 2400 shown in FIG. 24. In one example, the procedure 2300 can be performed by a computing device with the computing device architecture 2400. The computing device can include any suitable device, such as a mobile device (e.g., a mobile phone), a desktop computing device, a tablet computing device, a wearable device, a server (e.g., in a software as a service (SaaS) system or other server-based system), and/or any other computing device with the resource capabilities to perform the processes described herein, including procedure 2300. In some cases, the computing device or apparatus may include various components, such as one or more input devices, one or more output devices, one or more processors, one or more microprocessors, one or more microcomputers, and/or other component that is configured to carry out the steps of processes described herein. In some examples, the computing device may include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Procedure 2300 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 24 illustrates an example computing device architecture 2400 of an example computing device which can implement the various techniques described herein. For example, the computing device architecture 2400 can implement the question answering system 300 shown in FIG. 3. The components of computing device architecture 2400 are shown in electrical communication with each other using connection 2405, such as a bus. The example computing device architecture 2400 includes a processing unit (CPU or processor) 2410 and computing device connection 2405 that couples various computing device components including computing device memory 2415, such as read only memory (ROM) 2420 and random access memory (RAM) 2425, to processor 2410.

Computing device architecture 2400 can include a cache of high-speed memory connected directly with, in close proximity to, or integrated as part of processor 2410. Computing device architecture 2400 can copy data from memory 2415 and/or the storage device 2430 to cache 2412 for quick access by processor 2410. In this way, the cache can provide a performance boost that avoids processor 2410 delays while waiting for data. These and other modules can control or be configured to control processor 2410 to perform various actions. Other computing device memory 2415 may be available for use as well. Memory 2415 can include multiple different types of memory with different performance characteristics. Processor 2410 can include any general purpose processor and a hardware or software service, such as service 1 2432, service 2 2434, and service 3 2436 stored in storage device 2430, configured to control processor 2410 as well as a special-purpose processor where software instructions are incorporated into the processor design. Processor 2410 may be a self-contained system, containing multiple cores or processors, a bus, memory controller, cache, etc. A multi-core processor may be symmetric or asymmetric.

To enable user interaction with the computing device architecture 2400, input device 2445 can represent any number of input mechanisms, such as a microphone for speech, a touch-sensitive screen for gesture or graphical input, keyboard, mouse, motion input, speech and so forth. Output device 2435 can also be one or more of a number of output mechanisms known to those of skill in the art, such as a display, projector, television, speaker device, etc. In some instances, multimodal computing devices can enable a user to provide multiple types of input to communicate with computing device architecture 2400. Communication interface 2440 can generally govern and manage the user input and computing device output. There is no restriction on operating on any particular hardware arrangement and therefore the basic features here may easily be substituted for improved hardware or firmware arrangements as they are developed.

Storage device 2430 is a non-volatile memory and can be a hard disk or other types of computer readable media which can store data that are accessible by a computer, such as magnetic cassettes, flash memory cards, solid state memory devices, digital versatile disks, cartridges, random access memories (RAMS) 2425, read only memory (ROM) 2420, and hybrids thereof. Storage device 2430 can include services 2432, 2434, 2436 for controlling processor 2410. Other hardware or software modules are contemplated. Storage device 2430 can be connected to the computing device connection 2405. In one aspect, a hardware module that performs a particular function can include the software component stored in a computer-readable medium in connection with the necessary hardware components, such as processor 2410, connection 2405, output device 2435, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The invention claimed is:

1. A device for detecting a zone of communication between a phased array antenna and a satellite constellation including a plurality of satellites in non-geosynchronous (non-GEO) orbit, the device comprising:
    one or more processors; and
    memory storing thereon instructions that, as a result of being executed by the one or more processors, cause the device to:
        determine a location of the device;
        determine an original field of regard corresponding to an antenna aperture of the phased array antenna, wherein the original field of regard is associated with a level of communication between the phased array antenna and the satellite constellation;
        output, to a user of the device, a graphical representation of the original field of regard, wherein the graphical representation of the original field of regard includes an indication of image data required to determine an actual level of communication between the phased array antenna and the satellite constellation;
        obtain new image data corresponding to one or more scans of the original field of regard using the device, wherein the indication of the image data required to determine the actual level of communication is updated in real-time as the new image data is obtained;
        modify the original field of regard for detecting the zone of communication between the phased array antenna and the satellite constellation to generate a modified field of regard, wherein the original field of regard is modified based on the new image data and one or more factors; and
        output, to the user of the device, an indication of a modified level of communication between the phased array antenna and the satellite constellation associated with the modified field of regard.

2. The device of claim 1, wherein the one or more factors are selected from a set comprising a tilt angle of the antenna aperture of the phased array antenna, scan angle of the phased array antenna, a minimum elevation angle for the phased array antenna, a GEO-belt interference zone, and orbits of the plurality of satellites.

3. The device of claim 2, wherein the one or more factors include one or more obstructions within the original field of regard that prevent signals from being transmitted between the phased array antenna and the satellite constellation, and wherein the one or more obstructions are identified based on the new image data.

4. The device of claim 2, wherein the modified field of regard corresponds to a mask mapped onto a spherical section representing a sky view at the location, and wherein the mask is generated based on the one or more factors.

5. The device of claim 2, wherein the instructions that cause the device to output the indication of the modified level of communication between the phased array antenna and the satellite constellation further cause the device to display, within a display element of the device, a portion of the modified field of regard that is visible within a field of view (FOV) of an image sensor of the device.

6. The device of claim 2 wherein the indication of the image data required to determine the actual level of communication includes a percentage of the original field of regard scanned using the device and a set of graphical dots, and wherein the set of graphical dots denote regions of the original field of regard yet to be scanned using the device.

7. The device of claim 2, wherein the instructions that cause the device to obtain the image data further cause the device to:
    capture one or more image frames using an image sensor implemented on the device;
    determine an attitude of the device, wherein the attitude is determined as the one or more image frames are captured; and
    dynamically update in real-time the indication of the image data according to the one or more image frames and the attitude of the device.

8. A method for detecting a zone of communication between a phased array antenna and a satellite constellation including a plurality of satellites in non-geosynchronous (non-GEO) orbit, the method comprising:
    determining a location of a device;
    determining an original field of regard corresponding to an antenna aperture of the phased array antenna, wherein the original field of regard is associated with a level of communication between the phased array antenna and the satellite constellation;
    outputting, to a user of the device, a graphical representation of the original field of regard, wherein the graphical representation of the original field of regard includes an indication of image data required to determine an actual level of communication between the phased array antenna and the satellite constellation;
    obtaining new image data corresponding to one or more scans of the original field of regard using the device, wherein the indication of the image data required to determine the actual level of communication is updated in real-time as the new image data is obtained;
    modifying the original field of regard for detecting the zone of communication between the phased array antenna and the satellite constellation to generate a modified field of regard, wherein the original field of regard is modified based on the new image data and one or more factors; and
    outputting, to the user of the device, an indication of a modified level of communication between the phased array antenna and the satellite constellation associated with the modified field of regard.

9. The method of claim 8, wherein the one or more factors are selected from a set comprising a tilt angle of the antenna aperture of the phased array antenna, scan angle of the phased array antenna, a minimum elevation angle for the phased array antenna, a GEO-belt interference zone, and orbits of the plurality of satellites.

10. The method of claim 8, wherein the one or more factors include one or more obstructions within the original field of regard that prevent signals from being transmitted between the phased array antenna and the satellite constellation, and wherein the one or more obstructions are identified based on the new image data.

11. The method of claim 8, wherein the modified field of regard corresponds to a mask mapped onto a spherical section representing a sky view at the location, and wherein the mask is generated based on the one or more factors.

12. The method of claim 8, wherein outputting the indication of the modified level of communication between the phased array antenna and the satellite constellation includes displaying, within a display element of the device, a portion of the modified field of regard that is visible within a field of view (FOV) of an image sensor of the device.

13. The method of claim 8, wherein the indication of the image data required to determine the level of communication includes a percentage of the original field of regard scanned using the device and a set of graphical dots, and wherein the set of graphical dots denote regions of the original field of regard yet to be scanned using the device.

14. The method of claim 8, wherein obtaining the image data includes:
capturing one or more image frames using an image sensor implemented on the device;
determining an attitude of the device, wherein the attitude is determined as the one or more image frames are captured; and
dynamically updating in real-time the indication of the image data according to the one or more image frames and the attitude of the device.

15. A non-transitory, computer-readable storage medium storing thereon executable instructions that, as a result of being executed by one or more processors of a computing device, cause the computing device to:
determine a location of the computing device;
determine an original field of regard corresponding to an antenna aperture of a phased array antenna, wherein the original field of regard is associated with a level of communication between the phased array antenna and a satellite constellation including a plurality of satellites in non-geosynchronous (non-GEO) orbit;
output, to a user of the device, a graphical representation of the original field of regard, wherein the graphical representation of the original field of regard includes an indication of image data required to determine an actual level of communication between the phased array antenna and the satellite constellation;
obtain new image data corresponding to one or more scans of the original field of regard using the device, wherein the indication of the image data required to determine the actual level of communication is updated in real-time as the new image data is obtained;
modify the original field of regard for detecting a zone of communication between the phased array antenna and the satellite constellation to generate a modified field of regard, wherein the original field of regard is modified based on the new image data and one or more factors; and
output, to the user of the computing device, an indication of a modified level of communication between the phased array antenna and the satellite constellation associated with the modified field of regard.

16. The non-transitory, computer-readable storage medium of claim 15, wherein the one or more factors are selected from a set comprising a tilt angle of the antenna aperture of the phased array antenna, scan angle of the phased array antenna, a minimum elevation angle for the phased array antenna, a GEO-belt interference zone, and orbits of the plurality of satellites.

17. The non-transitory, computer-readable storage medium of claim 15, wherein the one or more factors include one or more obstructions within the original field of regard that prevent signals from being transmitted between the phased array antenna and the satellite constellation, and wherein the one or more obstructions are identified based on the new image data.

18. The non-transitory, computer-readable storage medium of claim 15, wherein the modified field of regard corresponds to a mask mapped onto a spherical section representing a sky view at the location, and wherein the mask is generated based on the one or more factors.

19. The non-transitory, computer-readable storage medium of claim 15, wherein the executable instructions that cause the computing device to output the indication of the modified level of communication between the phased array antenna and the satellite constellation further cause the computing device to display, within a display element of the computing device, a portion of the modified field of regard that is visible within a field of view (FOV) of an image sensor of the computing device.

20. The non-transitory, computer-readable storage medium of claim 15, wherein the indication of the image data required to determine the level of communication includes a percentage of the original field of regard scanned using the device and a set of graphical dots, and wherein the set of graphical dots denote regions of the original field of regard yet to be scanned using the device.

* * * * *